(12) United States Patent
Kim et al.

(10) Patent No.: US 12,354,511 B2
(45) Date of Patent: Jul. 8, 2025

(54) ELECTRONIC DEVICE HAVING FLEXIBLE DISPLAY WITH VARIABLE SIZE AND REFERENCE POSITION AND SCREEN CONTROL METHOD THEREOF

(71) Applicant: SAMSUNG ELECTRONICS CO., LTD., Suwon-si (KR)

(72) Inventors: Raetae Kim, Suwon-si (KR); Gyeongtae Park, Suwon-si (KR); Dahee Kim, Suwon-si (KR); Songyi Lee, Suwon-si (KR); Jonghwa Lee, Suwon-si (KR); Jihea Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/983,769

(22) Filed: Nov. 9, 2022

(65) Prior Publication Data

US 2023/0074701 A1   Mar. 9, 2023

Related U.S. Application Data

(63) Continuation of application No. PCT/KR2021/014010, filed on Oct. 12, 2021.

(30) Foreign Application Priority Data

Oct. 12, 2020   (KR) .................. 10-2020-0131320
Dec. 14, 2020   (KR) .................. 10-2020-0174750

(51) Int. Cl.
  *G09G 3/20*   (2006.01)
  *G09G 3/00*   (2006.01)

(52) U.S. Cl.
  CPC .............. *G09G 3/20* (2013.01); *G09G 3/035* (2020.08); *G09G 2330/021* (2013.01); *G09G 2340/04* (2013.01); *G09G 2354/00* (2013.01)

(58) Field of Classification Search
  CPC ......... G09G 2330/021; G09G 2340/04; G09G 2354/00; G09G 3/035; G09G 3/20;
  (Continued)

(56) References Cited

U.S. PATENT DOCUMENTS 6,356,279 B1   3/2002   Halstead, Jr. et al.
10,037,593 B2   7/2018   Srinivasan et al.
(Continued)

FOREIGN PATENT DOCUMENTS

JP   2003-506768   2/2003
KR   10-2010-0025360   3/2010
(Continued)

OTHER PUBLICATIONS

Extended European Search Report dated Jul. 20, 2023 for EP Application No. 21880461.5.
(Continued)

*Primary Examiner* — Richard J Hong
(74) *Attorney, Agent, or Firm* — Nixon & Vanderhye P.C.

(57) ABSTRACT

An electronic device and its screen control method are disclosed. The electronic device may include a flexible display configured to change a size of a display area and at least one processor. The at least one processor may, based on a first screen being displayed in the display area of a first size, receive an input for changing the display area into a second size The at least one processor may, based on the display area being changed to the second size according to the received input, control the display to display a second screen which changes the first screen in response to the second size in the display area changed into the second size. The second screen may include, among a plurality of elements in content, a first element corresponding to an element in the first screen and a second element of the content.

15 Claims, 21 Drawing Sheets

(58) Field of Classification Search
CPC ..... G09G 5/22; G06F 3/04886; G06F 3/0481; G06F 1/1677; G06F 3/04817; G06F 3/0482; G06F 3/04883; G06F 1/1652; G06F 3/0485; G06V 20/63; H04M 1/0268

See application file for complete search history.

(56) References Cited

U.S. PATENT DOCUMENTS

| | | | |
|---|---|---|---|
| 10,379,720 | B2 | 8/2019 | Ryu et al. |
| 10,936,100 | B2 | 3/2021 | Park et al. |
| 10,977,771 | B2 | 4/2021 | Jeong et al. |
| 11,231,895 | B2 | 1/2022 | Choi et al. |
| 2011/0314424 | A1* | 12/2011 | Gusmorino ......... G06F 3/04817 715/846 |
| 2013/0229324 | A1 | 9/2013 | Chang et al. |
| 2013/0275910 | A1* | 10/2013 | Kim ..................... G06F 1/1652 715/800 |
| 2016/0210768 | A1* | 7/2016 | Yoo ........................ G06V 20/63 |
| 2017/0011714 | A1* | 1/2017 | Eim ....................... G06F 1/1677 |
| 2017/0140504 | A1* | 5/2017 | Jeong .................... G06F 1/1677 |
| 2017/0147189 | A1* | 5/2017 | Ryu ..................... G06F 3/04886 |
| 2018/0136822 | A1* | 5/2018 | Seibert ............... G06F 3/04883 |
| 2018/0203578 | A1* | 7/2018 | Murphy ................ G06F 3/0481 |
| 2018/0275770 | A1 | 9/2018 | Kang et al. |
| 2018/0284964 | A1* | 10/2018 | Kang ................... H04M 1/0268 |
| 2019/0384438 | A1* | 12/2019 | Park ....................... G06F 3/0485 |
| 2021/0201726 | A1* | 7/2021 | Kim ....................... G09G 3/035 |
| 2021/0217133 | A1* | 7/2021 | Jeong .................. G06F 3/04883 |
| 2023/0259272 | A1* | 8/2023 | Xu ........................ G06F 3/0481 345/173 |

FOREIGN PATENT DOCUMENTS

| | | |
|---|---|---|
| KR | 10-2015-0099679 | 9/2015 |
| KR | 10-1680924 | 12/2016 |
| KR | 10-2017-0058816 A | 5/2017 |
| KR | 10-2017-0060519 | 6/2017 |
| KR | 10-2017-0062121 | 6/2017 |
| KR | 10-1752750 | 7/2017 |
| KR | 10-2019-0141518 | 12/2019 |
| KR | 10-2066575 | 1/2020 |
| KR | 10-2020-0100926 | 8/2020 |

OTHER PUBLICATIONS

International Search Report for PCT/KR2021/014010, mailed Feb. 4, 2022, 4 pages.
Written Opinion of the ISA for PCT/KR2021/014010, mailed Feb. 4, 2022, 4 pages.
India Office Action dated Mar. 13, 2024 for IN Application No. 202337032055.
Korean Office Action dated Sep. 26, 2024 for KR Application No. 10-2020-0174750.
Korean Notice of Patent Grant dated Feb. 4, 2025 for KR Application No. 10-2020-0174750.
Chinese Office Action dated May 1, 2025 for CN Application No. 202180069811.5.
European Office Action dated Apr. 25, 2025 for EP Application No. 21880461.5.

* cited by examiner

ELECTRONIC DEVICE HAVING FLEXIBLE DISPLAY WITH VARIABLE SIZE AND REFERENCE POSITION AND SCREEN CONTROL METHOD THEREOF

CROSS-REFERENCE TO RELATED APPLICATIONS

This application is a continuation of International Application No. PCT/KR2021/014010 designating the United States, filed on Oct. 12, 2021, in the Korean Intellectual Property Receiving Office and claiming priority to Korean Patent Application No. 10-2020-0131320, filed on Oct. 12, 2020, in the Korean Intellectual Property Office and Korean Patent Application No. 10-2020-0174750, filed on Dec. 14, 2020, in the Korean Intellectual Property Office, the disclosures of which are incorporated by reference herein in their entireties

BACKGROUND

Field

The disclosure relates to an electronic device and a screen control method thereof. For example, the disclosure relates to the electronic device including a flexible display and the screen control method thereof.

Description of Related Art

In recent, use of a flexible-type electronic device capable of changing a physical shape of a display area is spreading. For example, a foldable-type, rollable-type, or slidable-type electronic device adopts a structure for expanding or reducing the display area, and thus may maintain portability and provide a wide screen by expanding a size of the display area as necessary.

If the display area is resized (e.g., expanded or reduced) in the flexible-type electronic device, a layout adequately configured to the resize of the display area may be demanded If a display area of a flexible-type electronic device is resized (e.g., expanded or reduced), a problem that content configuration changes or content of a screen is out of focus in the screen before/after the resize of the display area may occur.

If the display area of the flexible-type electronic device is resized, a content display state provided before/after the resize of the display area may be discontinued thus causing user's inconvenience.

SUMMARY

Embodiments of the disclosure provide an electronic device and a screen control method thereof, for maintaining continuity of content and user-centered content focus in a screen before/after resize of a display area.

Embodiments of the disclosure provide an electronic device and a screen control method thereof, for providing a continuous content viewing experience to a user before/after resize of a display area.

Embodiments of the disclosure provide an electronic device and a screen control method thereof, for providing a stable screen switch by compensating for screen vibration or shaking due to resize of a display area.

An electronic device according to various example embodiments may include: a flexible display configured to change a size of an area exposed to outside of the electronic device, and at least one processor connected to the flexible display. The at least one processor may be configured to: based on the area being in a first size and a first screen being displayed in the area, receive an input for changing the area into a second size, and based on the area being changed to the second size according to the input, display a second screen changing the first screen corresponding to the second size in the area changed into the second size. The second screen may include, among a plurality of elements in content, a first element corresponding to an element in the first screen and a second element of the content.

An electronic device according to various example embodiments may include a flexible display configured to change a size of an area exposed to outside of the electronic device, and at least one processor connected to the flexible display. The at least one processor may be configured to: based on the area being in a first size and a first screen including a part of an object being displayed in the area, receive an input for expanding a size of the area to a second size, and based on the area being expanded to the second size according to the input, display a second screen expanding the first screen corresponding to the second size in the area expanded to the second size. The second screen may include at least part of a first element corresponding to the object and a second object.

According to various example embodiments, continuity of content and user-centered content focus may be maintained in a screen before/after resizing a display area.

According to various example embodiments, a continuous content viewing experience may be provided to a user before/after resizing a display area.

According to various example embodiments, a stable screen switch may be provided by compensating for screen vibration or shaking due to resize of a display area.

Besides, various effects obtained directly or indirectly from the present disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereafter, various example embodiments are disclosed with reference to the attached drawings.

Example configurations of an electronic device according to various embodiments is described by referring to FIG. 1A, FIG. 1B, FIG. 2A, FIG. 2B, FIG. 2C and FIG. 2D. The depicted example configurations are provided to merely aid in understanding and description of various embodiments, and the scope of the embodiments is not limited to any particular structure. Various embodiments which modify, change, apply and expand the illustrated structure are possible, within a range including a flexible display.

An electronic device according to various embodiments may include a flexible display (e.g., a slidable display or a rollable display). The flexible display may be a display in which a size of an area exposed to outside of the electronic device (or viewed from a front surface of the electronic device) is changed (e.g., expanded or reduced).

In the following explanations, the area of the display exposed to the outside of the electronic device may be referred to as a display area. The display area may indicate a physical area. A screen may be displayed through the display area. If the display area is resized, a screen size displayed in the area may change in response to the resize of the display area.

Figure 1A:
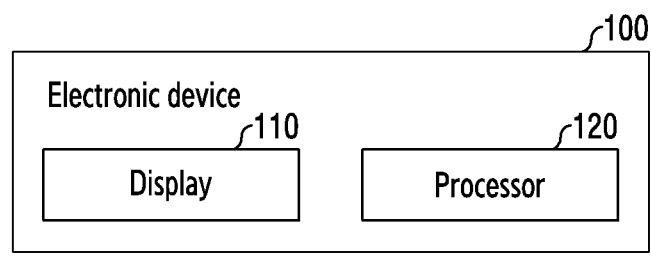
FIG. 1A is a block diagram illustrating an example configuration of an electronic device according to various embodiments.

FIG. 1A is a block diagram illustrating an example configuration of an electronic device according to various embodiments.

Referring to FIG. 1A, an electronic device 100 according to an embodiment may include a display 110 and at least one processor (e.g., including processing circuitry) 120. The display 110 and the at least one processor 120 included in the electronic device 100 may be electrically and/or operatively connected to each other to exchange a signal (e.g., command or data).

Figure 10:
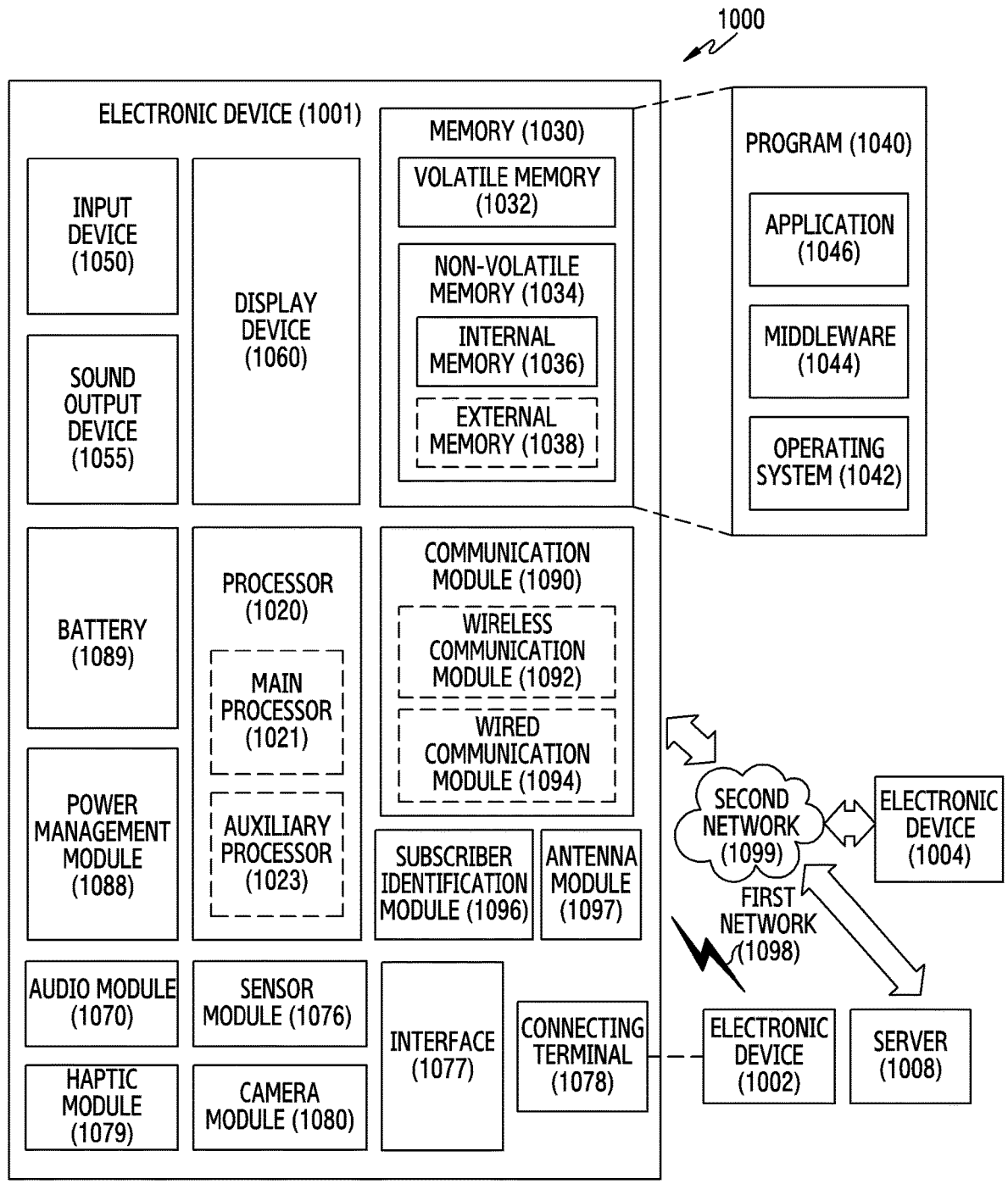
FIG. 10 is a block diagram illustrating an example electronic device in a network environment, according to various embodiments.

The electronic device 100 may include at least part of an electronic device 1001 shown in FIG. 10. For example, the display 110 may be a display module 1060 of FIG. 10. The processor 120 may be a processor (one of 1020, 1021 or 1023) of FIG. 10.

The electronic device 100 may include the display 110 of which a size of a display area exposed to outside of the electronic device 100 is changeable.

The display 110 may be a flexible display (e.g., a slidable display or a rollable display). The display 110 may be a display capable of resizing (e.g., expanding or reducing) the display area. The display 110 may be a display for changing its shape. The display 110 may have a flexible form factor. The size of the display area may change (e.g., expand or reduce) according to the deformation state (e.g., a sliding state, a rolling state, an expansion state, a reduction state, a maximum expansion state, a maximum reduction state, an intermediate state) of the display 110.

The display 110 may be a display which expands or reduces according to a user's input (e.g., a slide-in/slide-out input according to a sliding operation, a roll-in/roll-out input according to a rolling operation).

The display 110 may be slid or rolled in at least one direction (e.g., a widthwise direction or a lengthwise direction). The size of the display area exposed to the outside of the electronic device 100 may be changed by the sliding or rolling operation of the display 110.

The electronic device 100 may include a sliding structure or a rolling structure for resizing the display area.

The display 110 according to an embodiment may, for example, include a single-axis flexible display of the slidable or rollable type. For example, the display 110 may be slid out in a first direction (e.g., right of the widthwise direction or down of the lengthwise direction), and slid in in a second direction (e.g., left of the widthwise direction or up of the lengthwise direction) which is the opposite direction of the first direction based on the single axis. The size of the display area may be expanded by the sliding-out operation, and the size of the display area may be reduced by the sliding-in operation. The display 110 according to an embodiment may be a multi-axis flexible display of the slidable or rollable type. For example, the display 110 may be slid out in either expansion direction (e.g., outward, the widthwise direction (left and right), or the lengthwise direction (up and down)), and slid in in an opposite direction (e.g., inward, the widthwise direction (right and left) or the lengthwise direction (down and up)) based on the multi-axis. The size of the display area may be expanded by the bidirectional sliding-out operation, and the size of the display area may be reduced by the bidirectional sliding-in operation.

The display area exposed to the outside of the electronic device 100 may be resized (e.g., expanded or reduced) depending on a user's input.

While the display area of the display 110 exposed to the outside of the electronic device 100 is in a first size and a first screen is displayed in the display area, the processor 120 may receive an input for changing the display area to a second size. For example, the input may be any one of a roll-out input for expanding the size of display area, a roll-in input for reducing the size of the display area, a slide-out input for expanding the size of the display area and a slide-in input for reducing the size of the display area.

While the display area is changed into the second size according to the input, the processor 120 may display a second screen which changes the first screen corresponding to the second screen, in the display area changed into the second size.

For example, if the display area is expanded according to the user's input, the processor 120 may identify the size of the expanded display area, based on an expansion distance of the display area. If the display area is reduced according to the user's input, the processor 120 may identify the size of the reduced display area, based on a reduction distance of the display area. The electronic device 100 may include a sensor structure (not shown, e.g., one or more hall sensors/magnets, a plurality of switches, a gyro sensor, an acceleration sensor, a grip sensor, a proximity sensor, a gesture sensor, an infrared (IR) sensor, or the like) for detecting the expansion distance or the reduction distance of the display area. If the size of the display area is changed from the first size to the second size (e.g., expanded or reduced), the processor 120 may display the second screen which changes the first screen displayed in the display area of the first size corresponding to the second size (e.g., scales according to the changed size or a ratio corresponding to the changed size), through the display area changed to the second size.

For example, the first screen may include content elements before the scaling. The second screen may include content elements after the scaling.

The content may include a plurality of elements (content elements, e.g., objects such as text, image, and video or at least part of the object). For example, one of a plurality of content pages (e.g., webpages, wired/wireless internet pages, application pages) including the content may be set to a first display portion to be included in the first screen and displayed through the display area of the first size.

The content may be scaled if the display area is changed (e.g., expanded or reduced) from the first size to the second size. For example, if scaling the content, a text in the content may be rearranged according to the scaled text area size, or an image or a video, or its part in the content may be resized according to a scaling ratio (e.g., a ratio of the first size and the second size). One of a plurality of content pages including the scaled content may be set to a second display portion to be included in the first screen and displayed through the display area changed to the second size.

The second screen may include a first element corresponding to the element in the first screen and a second element in the content, among the plurality of the elements (e.g., objects such as text, image, and video or at least part of the object) in the content.

In an embodiment, the element (hereafter, a reference element) in the first screen corresponding to the first element of the second screen may be a display reference. For example, the reference element may be an element displayed in response to a reference position (e.g., any one of a zero point, a start point, a top line, and a top sector) of the area of the first size. For example, the reference element may be any one of a reference point (e.g., a start point at the top of the first screen), a reference word (a first word at the top of the first screen), a reference line (a first line at the top of the first screen), a reference object (an object at the top of the first screen), and at least part of the reference object displayed at the reference position of the area of the first size.

The reference position may indicate a physical reference position of the display area (e.g., any one of a zero point, a start point, particular coordinates which is the reference, a vertical axis reference point, and a vertical axis zero point of the display area). The reference position of the display area may be fixed even if the screen or the content in the screen displayed in the display area is changed.

The reference element which is the content display reference may be displayed in response to the reference position (e.g., a start point) of the display area. The reference element in the first screen may be displayed in response to the reference position of the display area. The reference element in the second screen may be displayed in response to the reference position of the area changed to the second size.

The display portion in the content may be set based on the reference element.

If the display area is changed from the first size to the second size, the second display portion of the content to be included in the second screen may be set based on the reference element in the first screen. For example, the second display portion may be set, to include the first element corresponding to the reference element in the first screen, and the second element different from the element in the first screen and not included in the first screen, in the scaled content. The second display portion may be included in the second screen and displayed in the display area changed into the second size.

In an embodiment, the second display portion in the content to be included in the second screen may be set based on any one of a type of the reference element in the first screen, a position of the reference element in the first screen and user setting related to the screen display (e.g., a text first mode, a scalable object first mode, or a display reference hold mode).

The second display portion to be included in the second screen in the content may be set to include the first element and the second element. For example, the first element, which is the element corresponding to the reference element in the first screen, may be the reference element of the second screen. The second element is different from the element in the first screen, and may not be displayed in the area if the area is in the first size.

The reference element in the first screen corresponding to the first element may be displayed at the top of the area of the first size. The first element may be displayed at the top of the area changed into the second size. The second element may be displayed at the bottom of the area changed into the second size.

If the reference element in the first screen is of a text type, a text corresponding to the reference element may be rearranged and included in the second screen. If the reference element in the first screen is of an image or video type, an image or at least part of a video corresponding to the reference element may be resized and included in the second screen.

The reference element which is the reference for setting the display portion in the content may be any one of a reference point, a reference word, a reference line, a reference object, and at least part of the reference object included in the content.

For example, the reference element may be the reference point in the content. The reference point may be any one of a point, a spot, a zero point (e.g., (0, 0), a start point, plane coordinates (e.g., (x, y)), any one of the plane coordinates (e.g., (0, y), (x, 0)), a pixel, a basic unit of the display, and one point (e.g., a start point) of the reference line (e.g., the uppermost pixel line, a first pixel line) related to the content display.

As another example, the reference point may be any one of the reference word (e.g., a first word at the top of the first screen), the reference line (e.g., a sentence at the top of the first screen), the reference object (e.g., an object of the image or video type positioned at the top of the first screen), a first paragraph (e.g., a text first paragraph positioned at the top of the first screen), and at least part of the image or video type object (e.g., an object portion positioned at the top of the first screen), among the elements in the content.

Unlike the fixed form factor which physically fixes the size of the display area, the display 110 (e.g., a slidable display, a rollable display) which is the flexible form factor may frequently change the size of the display area according to the user's input.

Various embodiments may continuously maintain the continuity of the content display in the flexible form factor, and the user-centered content focus, by adjusting the content display portion adaptively or in real time according to the resize of the display.

In various embodiments, the display reference may be adjusted (or moved) to set the content display portion to be displayed in the resized display area. The content may be moved and displayed according to the adjusted display reference. By moving the content based on the adjusted display reference, the display portion corresponding to the resized display area of the content may be set. Adjusting (or moving) the display reference may indicate adjusting (or moving) the position for displaying the reference element (e.g., the reference point, the reference word, the reference line, the reference object or at least part of the reference object) which is the display reference. By adjusting (or moving) the display reference and setting the content display portion corresponding to the resized display area based on the adjusted display reference, continuity of the content display and content focus may be maintained.

An adjustment scheme of the display reference will be explained in greater detail below with reference to the drawings. For convenience, embodiments in which the reference point (hereafter, a display reference point (e.g., a vertical axis reference point)) in the content displayed in response to the reference position (e.g., a zero point, a start point) of the display area is the display reference are mainly described in the following.

Figure 1B:
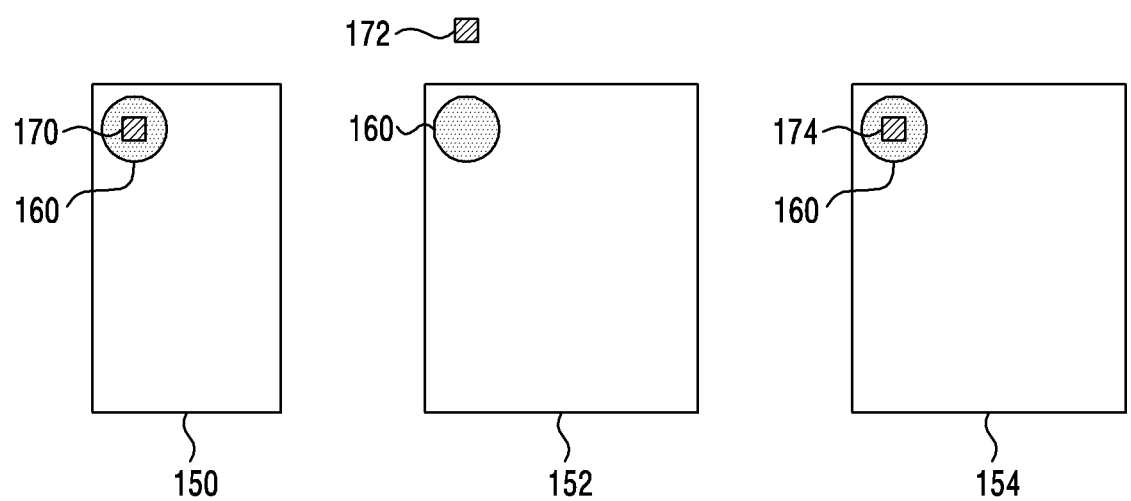
FIG. 1B is a diagram illustrating example changes of a display reference point in an electronic device according to various embodiments.

FIG. 1B is a diagram illustrating example changes of the display reference point in the electronic device according to various embodiments. The display 110 of the electronic device 100 as mentioned above may be a slidable display or a rollable display. FIG. 1B illustrates an example of the display expanded widthwise.

A reference numeral 150 illustrates the display area in a first state (e.g., a slide-in state, a roll-in state, a reduction state, or a maximum reduction state). Reference numerals 152 and 154 illustrate the display areas in a second state (e.g., a slide-out state, a roll-out state, an expansion state, a maximum expansion state or an intermediate state).

A reference numeral 160 is a reference position (e.g., a start point, a zero point) of the display areas 150, 152, and 154. As shown, the reference position may be fixed regardless of the resize of the display area.

Reference numerals 170, 172, and 174 illustrate a position change of the display reference point in the content. The reference numeral 170 illustrates the display reference point before expanding the display area. The reference numeral 172 illustrates the display reference point not adjusted (or moved) after expanding the display area. The reference numeral 174 illustrates the display reference point adjusted after expanding the display area.

In the display area 150 before the expansion, the display reference point 170 of the content may be displayed at the reference position 160 (e.g., a start point, a zero point, a Y axis zero point, a vertical axis reference point) of the display area.

The display area 150 may be expanded according to a user's input (e.g., a slide-in input, a roll-in input, a slide-out input, a roll-out input).

As the display area 150 is expanded, part of the content included in the first screen being displayed in the display area 150 before the expansion may move out of the screen. Hence, the display reference point 170 may disappear from the second screen displayed in the display area 152 and 154 after the expansion. The reference numeral 172 illustrates the display reference point not displayed in the display area 152 after the expansion.

The display reference point 172 of the content exceeding the second screen displayed in the display area 152 and 154 after the expansion may move lengthwise and return to the reference point 160 in the display area 154.

In an embodiment, the display reference point 174 of the content may be moved lengthwise (e.g., downward) and included in the second screen displayed in the display area 154 after the expansion. The display portion in the content may be set based on the display reference point 174 moved lengthwise.

As the display reference point 172 and 174 is moved lengthwise, the position of the display reference point 174 after expanding the display area may be adjusted (or moved) to correspond to the position of the display reference point 170 before expanding the display area. The display portion to be included in the second screen of the content may be set based on the adjusted display reference point 174. For example, the display portion in the content corresponding to the size of the expanded display area 154 may be designated, starting from the display reference point 174, and the display portion may be included in the second screen and displayed through the expanded display area.

The display area size of the display 110 may be changed (e.g., expanded or reduced) according to the sliding operation or the rolling operation.

For example, a main area which is a part of the display 110 may be viewable to outside all the time. An alpha area which is another part of the display 110 may be positioned inside a housing in the first state (e.g., the slide-in state or the roll-in state pushed into the housing) and not be viewable to the outside, and may be viewable to the outside in the second state (e.g., the slide-out state or the roll-out state pulled out of the housing).

As the alpha area is pushed into the housing and pulled out of the housing by the sliding-out operation or the rolling-out operation, the size of the display area may be expanded. As the alpha area pulled out of the housing is pushed into the housing by the sliding-in operation or the rolling-in operation, the size of the display area may be reduced.

The electronic device 100 according to an embodiment may include any one of displays 200, 202, and 204 illustrated in FIGS. 2A, 2B, 2C and 2D.

Figure 2A:
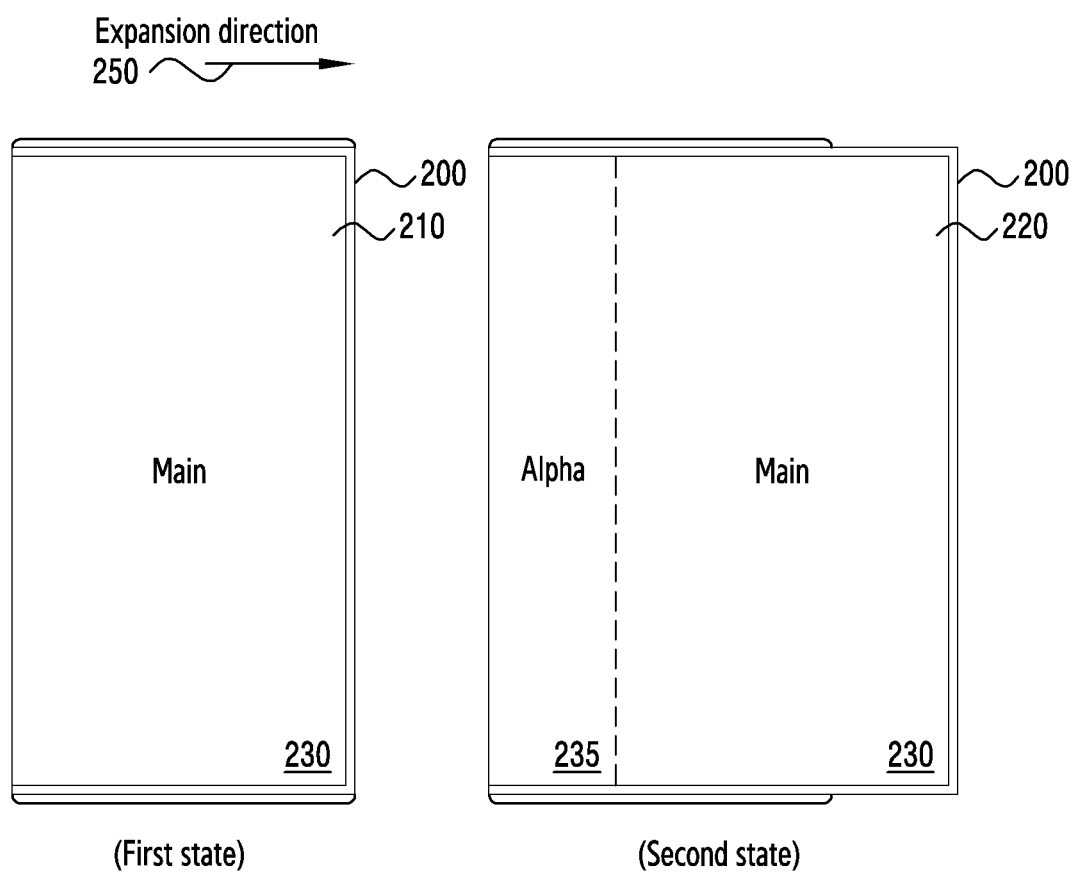
FIG. 2A and FIG. 2B are diagrams illustrating an example of a sliding state change in an electronic device according to various embodiments.
Figure 2B:
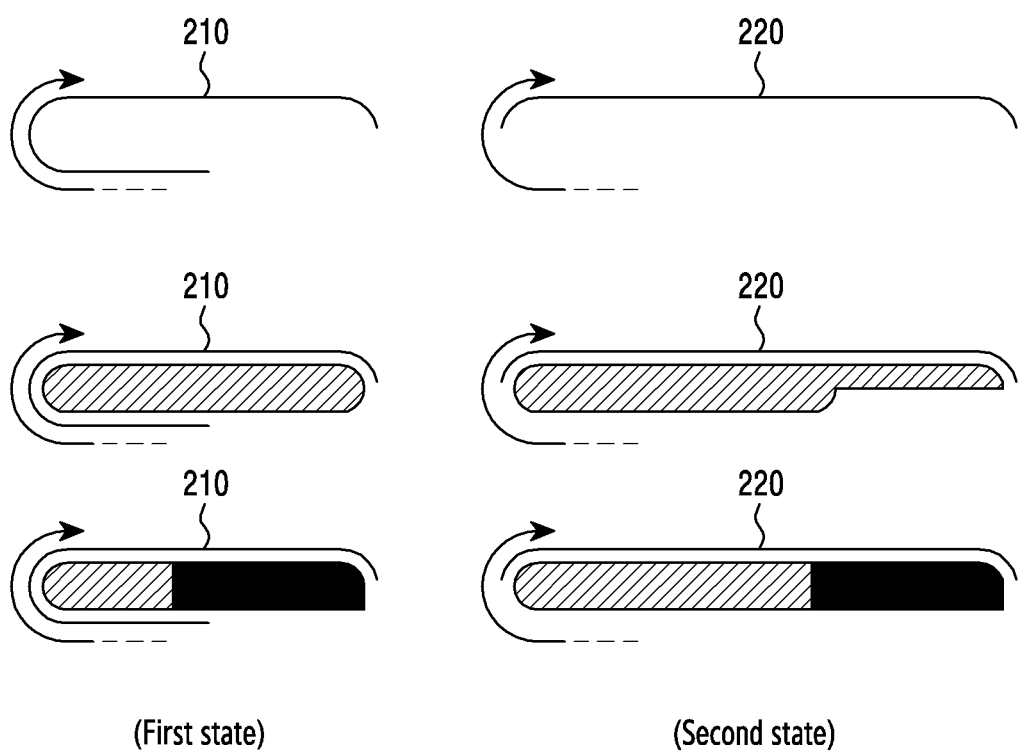

FIG. 2A and FIG. 2B are diagrams illustrating an example of a sliding state change in an electronic device according to various embodiments.

The electronic device 100 according to an embodiment may include the slidable display 200 as shown in FIG. 2A.

As shown in FIG. 2A and FIG. 2B, the slidable display 200 may be expanded or reduced in one direction (e.g., the widthwise direction (e.g., the X-axis direction)). The slidable display 200 may have a structure which is slide-out and expanded in a first direction 250 (e.g., to the right of the widthwise direction), or slide-in and reduced in a second direction (e.g., to the left of the widthwise direction) which is the opposite direction of the first direction.

As shown in FIG. 2A and FIG. 2B, the slidable display 200 may be rolled in a '⊂' shape or a '⊃' shape. If an operation of unfolding the display 200 (the sliding-out operation) is performed by the user, the rolled display 200 may be pushed out in the first direction 250 (e.g., to the right) to expand a first display area 210 of the display 200 to a second display area 220.

The reference numeral 210 of FIG. 2A and FIG. 2B illustrates the display area of the display 200 in the first state (e.g., a slide-in state, a pre-expansion state). The display area 210 of the first state may include a main area 230. The size of the display area 210 may be expanded by the sliding-out operation toward the first direction 250 (e.g., to the right).

The pre-expansion display area 210 may display a first screen. The post-expansion display area 220 may display a second screen. The first screen and the second screen may have different screen sizes (or aspect ratios). The screen size of the first screen may correspond to the size (or ratio) of the pre-expansion display area 210. The screen size of the second screen may correspond to the size (or ratio) of the post-expansion display area 220.

For example, if the display area 210 of the display 200 is expanded in the first direction 250 (e.g., to the right), the second screen (e.g., the aspect ratio 20:9) displayed in the post-expansion display area 220 may have the aspect ratio horizontally wider than the first screen (e.g., the aspect ratio 4:3) displayed in the pre-expansion display area 210.

The reference numeral 220 of FIG. 2A and FIG. 2B illustrates the display area of the display 200 in the second state (e.g., a slide-out state, a post-expansion state). The display area 220 in the slide-out state may include the main area 230 and an alpha area 235. The alpha area 235 may be an area which is rolled in in the slide-in state, and added (pushed out) as the display 200 is expanded by the sliding-out operation.

Figure 2C:
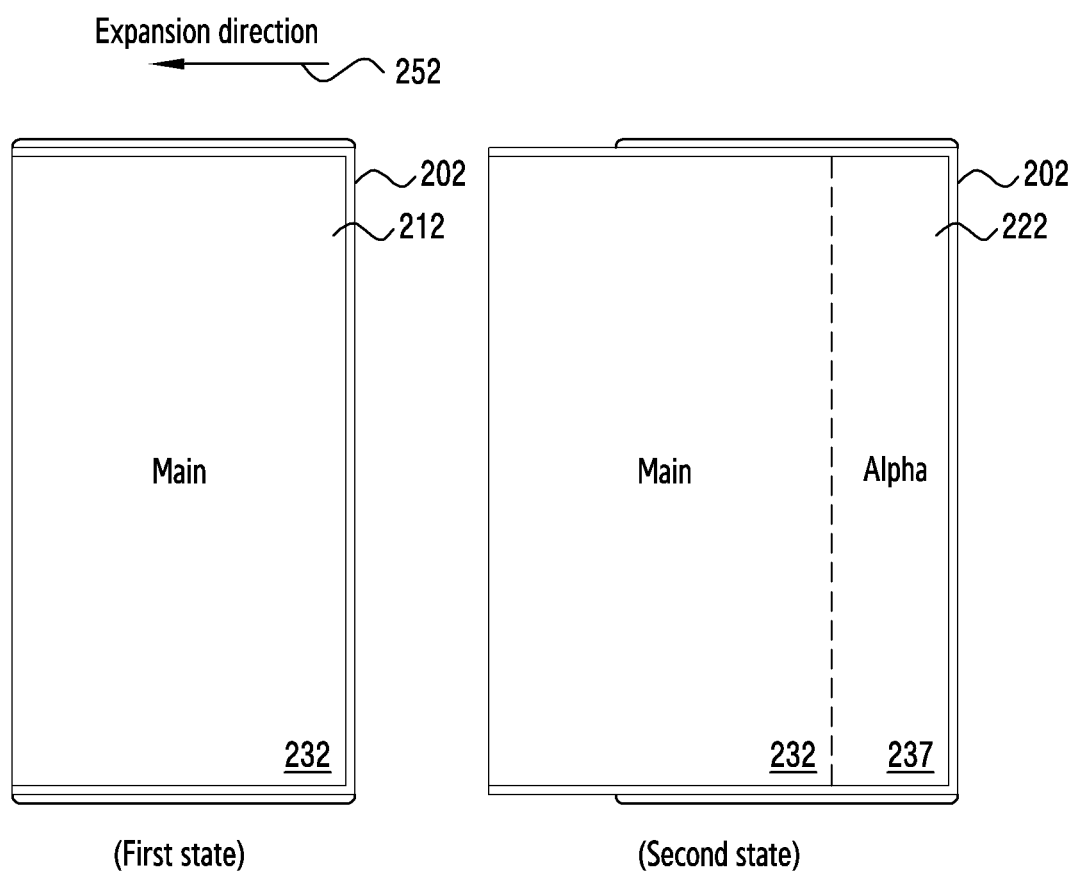
FIG. 2C is a diagram illustrating an example of a sliding state change in the electronic device according to various embodiments.

FIG. 2C is a diagram illustrating an example of a sliding state change in the electronic device according to various embodiments.

The electronic device 100 according to an embodiment may include the slidable display 202 as shown in FIG. 2C. As shown in FIG. 2C, the slidable display 202 may have a structure which is slide-out and expanded in a second direction 252 (e.g., to the left of the widthwise direction), or slide-in and reduced in a first direction (e.g., the right of the widthwise direction) which is the opposite direction of the second direction.

In FIG. 2C, a reference numeral 212 illustrates a display area of the display 202 in the first state (e.g., the slide-in state, the pre-expansion state). The display area 212 of the first state may include a main area 232. The size of the display area 212 may be expanded by the sliding-out operation toward the second direction 252 (e.g., the left).

A reference numeral 222 illustrates a display area of the display 202 in the second state (e.g., the slide-out state, the post-expansion state). The display area 210 of the slide-out state may include the main area 232 and an alpha area 237. The alpha area 237 may be an area which is rolled in in the slide-in state, and added (pushed out) as the display 202 is expanded by the sliding-out operation.

Figure 2D:
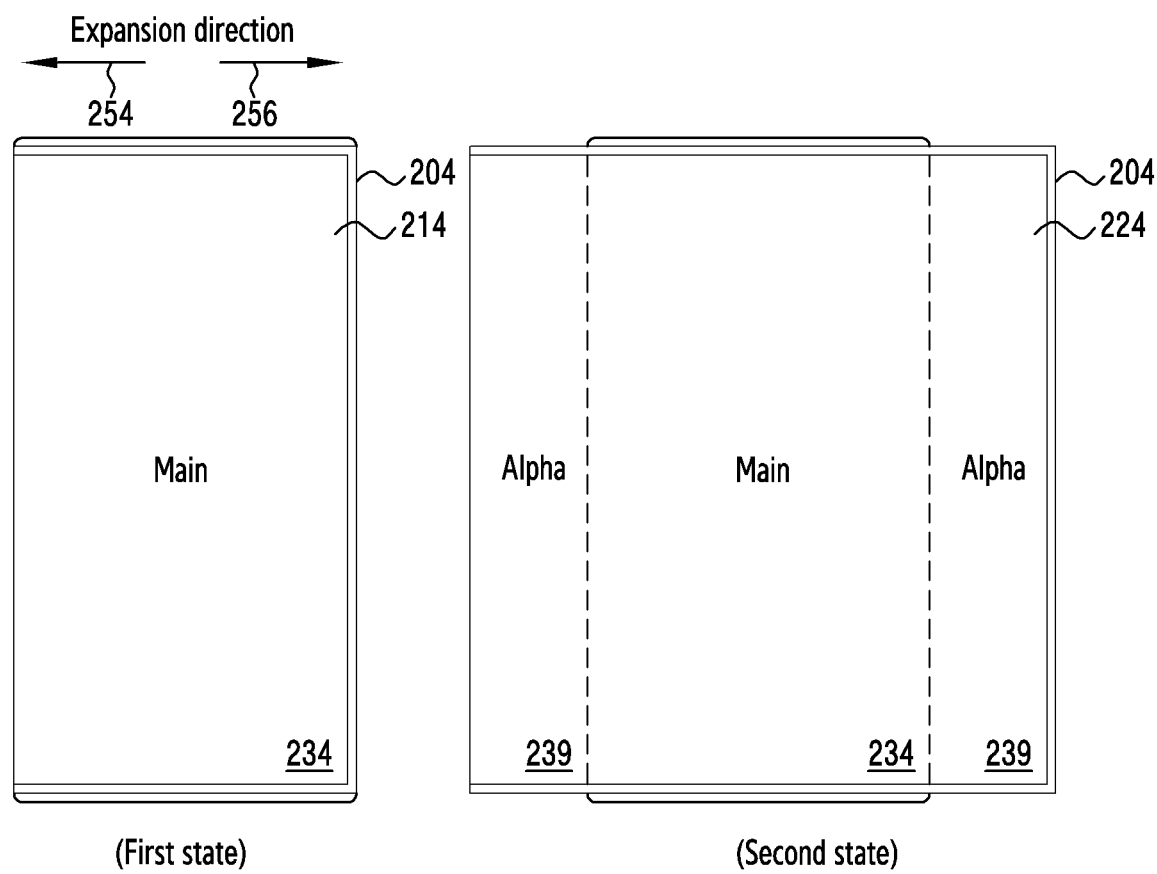
FIG. 2D is a diagram illustrating an example of a sliding state change in the electronic device according to various embodiments.

FIG. 2D is a diagram illustrating an example of a sliding state change in the electronic device according to various embodiments.

The electronic device 100 according to an embodiment may include the bidirectional slidable display 204 as shown in FIG. 2D. The slidable display 204 may be a multi-axis flexible display of the slidable type. In this case, the display 204 may have a deformable shape in both directions based on multi-axis. The electronic device 100 may have the structure which is slide-out and expanded in both expansion directions 254 and 256 (e.g., outward, to left and to right), or slide-in and reduced in both reduction directions (e.g., inward, to right and to left) based on the multi-axis.

In FIG. 2D, a reference numeral 214 illustrates the display area in the first state (e.g., the slide-in state, the pre-expansion state). A reference numeral 224 illustrates the display area in the second state (e.g., the slide-out state, the post-expansion state).

The display area 210 of the first state may include a main area 234. The size of the display area 210 may be expanded by the sliding-out operation toward the both expansion directions (e.g., the left and the right) 254 and 256.

The display area 220 of the second state may include the main area 230 and an alpha area 239. The alpha area 239 may be an area which is rolled in in the slide-in state, and added (pushed out) from both directions as the screen is expanded by the sliding-out operation.

As shown in FIG. 2A, FIG. 2B, FIG. 2C and FIG. 2D, the electronic device 100 may have the flexible form factor which resizes (e.g., expands/reduces) the area (or the screen) exposed to the outside of the electronic device 100.

In the form factor which changes the size of the display area, the screen size (or the aspect ratio) may change before/after the resize of the display area due to mechanical characteristics. The content display state may change due to the changed screen size (or aspect ratio). Due to the change of the content display state, the content being displayed may change or the content focus provided to the user may be lost.

According to various embodiments, by adjusting the display reference of the content according to the resize of the display area, continuous and natural content viewing experience may be provided to the user by compensating for an abrupt change of the content display which may occur due to the form factor characteristic which changes the size of the display area.

Hereafter, screen control of the electronic device according to various embodiments is described in greater detail below with reference to FIGS. 3A, 3B, 3C, 4A, 4B, 5A, 5B, 6A, 6B, 7A, 7B, 8A, 8B and 9. For convenience, the screen control of the electronic device 100 including the structure expanded/reduced in one direction (e.g., a widthwise direction) is mainly explained. However, the structure is merely an example and the range of the embodiments is not limited to a particular structure.

Figure 3A:
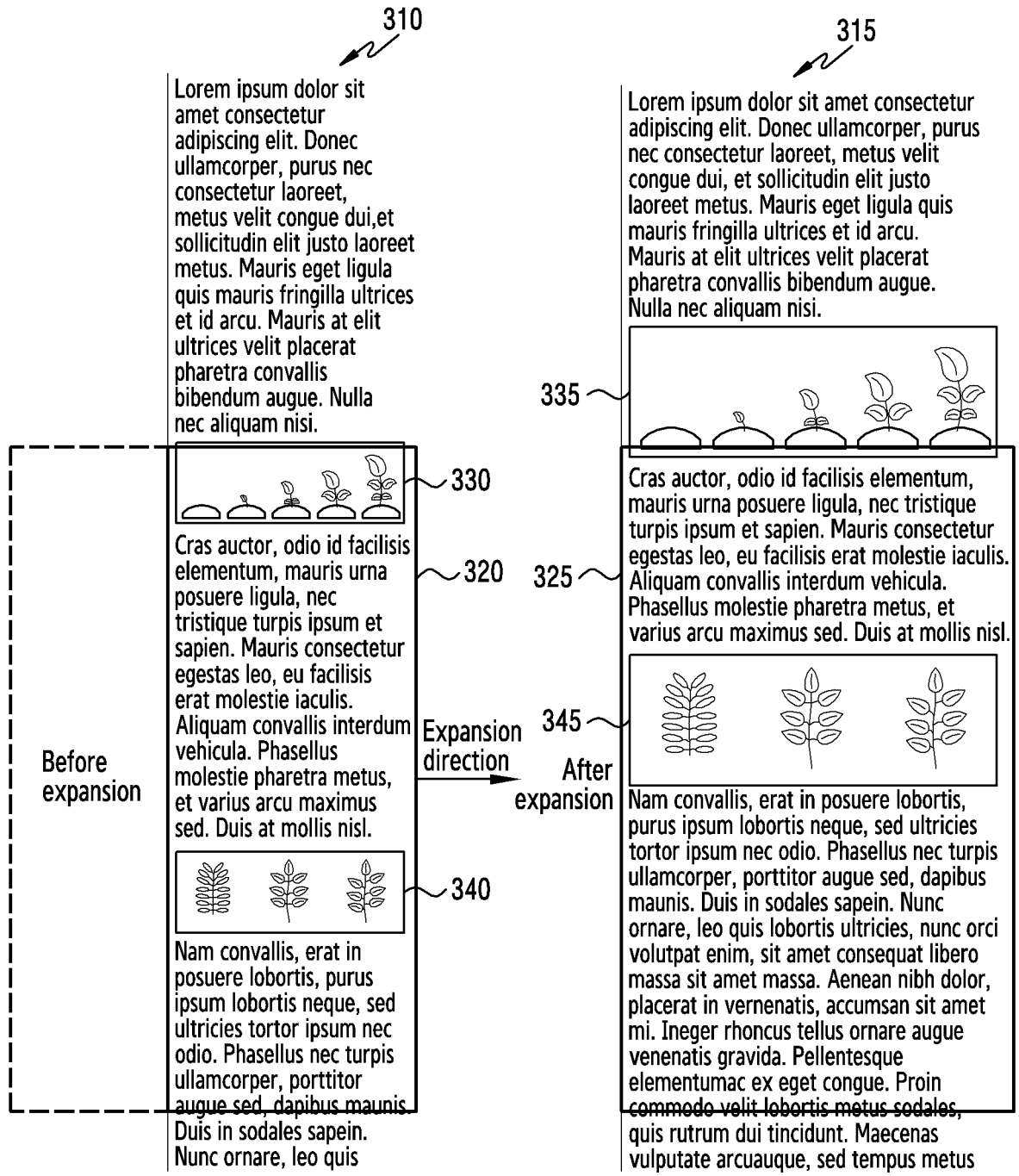
FIG. 3A is a diagram illustrating an example change according to screen size expansion according to comparative examples.

FIG. 3A is a diagram illustrating an example change according to screen size expansion according to comparative examples.

A reference numeral 310 illustrates content. A reference numeral 315 illustrates content scaled.

A reference numeral 320 illustrates a first screen before the expansion. A first screen 320 may be displayed in a pre-expansion display area. A size of the first screen 320 may correspond to the size of the pre-expansion display area. The first screen may include a first display portion (a first content page) which is a part of the content 310.

A reference numeral 325 illustrates a second screen after the expansion. A second screen 325 may be displayed in a post-expansion display area. A size of the second screen 325 may correspond to the size of the post-expansion display area. The second screen may include a second display portion (a second content page) which is a part of the scaled content 315. The second display portion may be a part corresponding to the first display portion, in the scaled content 315.

The pre-expansion first screen 320 may include the first display portion (the first content page) in the content 310. The first display portion included in the first screen 320 may include a first object 330 (e.g., a first image) and a second object 340 (e.g., a second image).

The content 310 may be scaled (enlarged) as the screen of the display 110 is expanded. A reference numeral 315 is the scaled (enlarged) content. As the size of the display area is expanded, the first screen 320 may be expanded to the second screen 325 and the scaled content 315 may be obtained. The second display portion (the second content page) corresponding to the first display portion (the first content page) may be set in the scaled content 315.

The second display portion (the second content page) may be included in the second screen. The scaled content 315 may include a first object 335 expanded and a second object 345 expanded. As shown, the expanded second object 345 may be included in the second screen 345 and displayed in the post-expansion display area. The expanded first object 335 may exceed the second screen 325 and may not be displayed in the post-expansion display area.

As such, if the display reference of the content is not adjusted in resizing the display area, loss of the displayed content or unnatural content change may be caused.

For example, some or whole of the content element (e.g., a text, an image, or a video) in the screen displayed in the pre-expansion display area may disappear from the screen after the expansion. The position or content of the content element displayed in the display area before the expansion may change to lose the user-centered content focus.

Figure 3B:
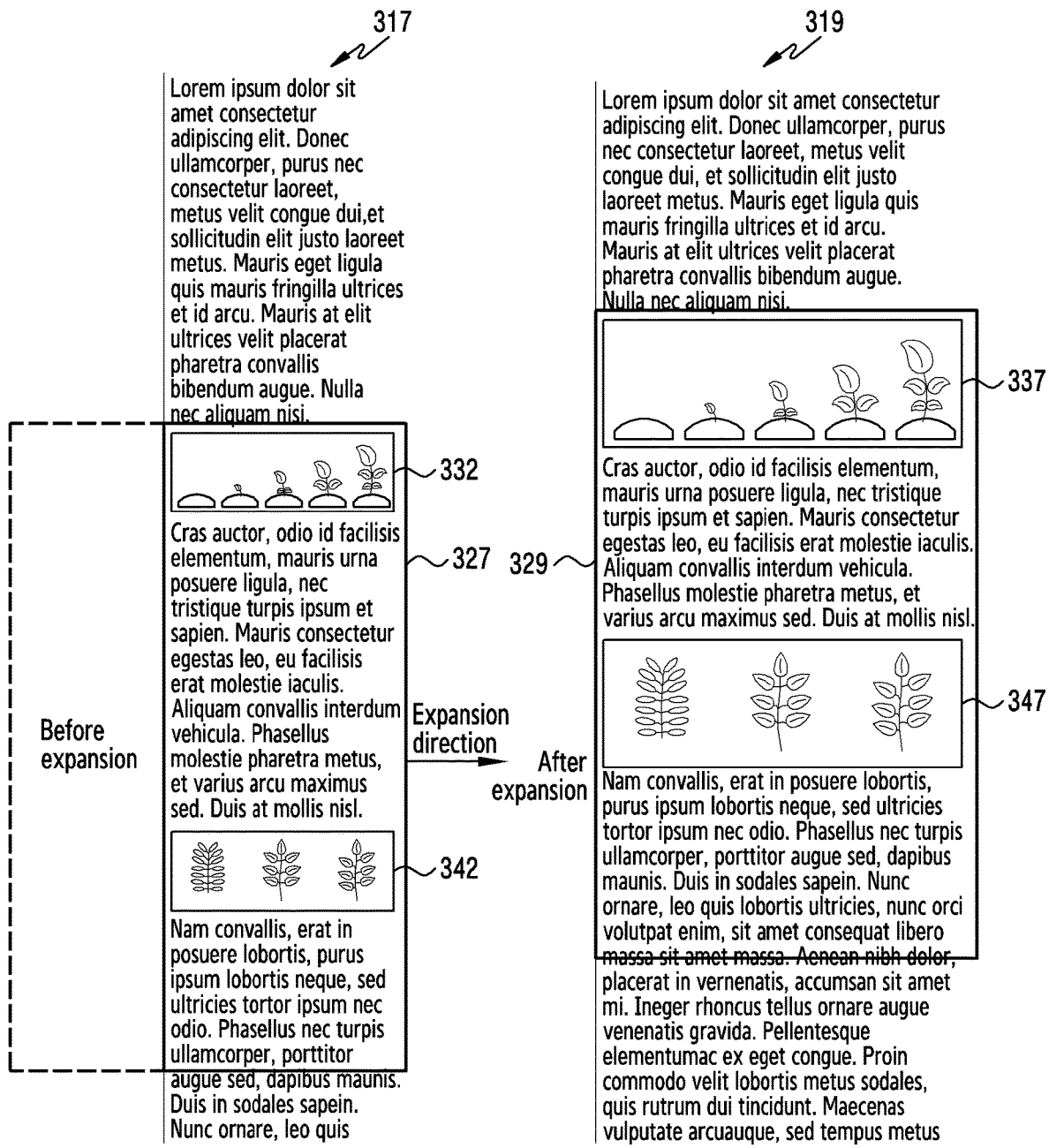
FIG. 3B and FIG. 3C are diagrams of example screens illustrating screen control according to various embodiments.
Figure 3C:
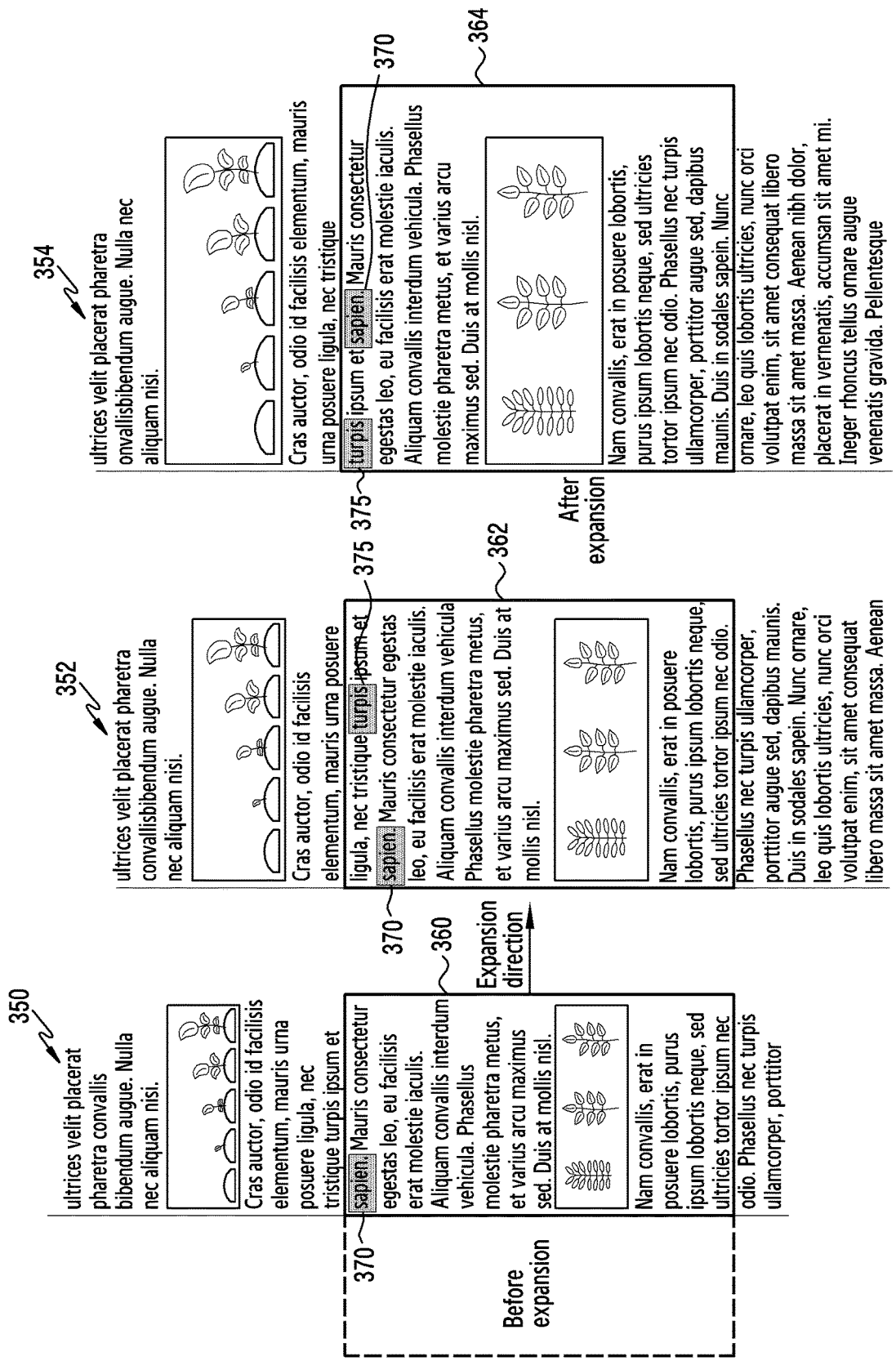

FIG. 3B and FIG. 3C are diagrams illustrating examples of screen control according to various embodiments.

In FIG. 3B, a reference numeral 317 illustrates the content. A reference numeral 319 illustrates the scaled content. A reference numeral 327 illustrates the first screen before the expansion. A reference numeral 329 illustrates the second screen after the expansion. The first screen 327 may be displayed in the pre-expansion display area. The second screen 329 may be displayed in the post-expansion display area.

The first display portion (the first content page) which is a part of the content 317 may be included in the pre-expansion first screen 327. The second display portion (the second content page) which is a part of the scaled content 319 may be included in the post-expansion second screen 329.

For example, the content 317 may include one or more content pages. Each content page may be any one of a web page, a wired/wireless internet page, and an application page. Part of the content 317 may be set to the first display portion (the first content page). The first display portion may be included in the pre-expansion first screen (e.g., an application screen, a home screen, a current screen, etc.) and displayed through the display area.

The content 317 may be scaled (enlarged) as the display area is resized and the first screen 327 is expanded to the second screen 329. A reference numeral 319 is the scaled (enlarged) content. As the size of the display area is expanded, the scaled content 319 may be obtained. The second display portion (the second content page) to be included in the second screen 329 may be set in the scaled content 319.

Part of the scaled content 319 may be set to the second display portion (the second content page). The second display portion may indicate a part corresponding to the first display portion of the pre-scaled content 317, in the scaled content 319.

The content 317 and 319 may include content elements of various types. The content element may be a component of the content. For example, the content element may be at least one of a text, an image, a video, a banner, an icon, java script, a function object, a symbol, a blank, an item, a content, or a component. The content element may be a graphic element (or a user interface (UI)/user experience (UX) element or a visual element). Any type of the element included in the screen and displayable on the display area may become the content element.

One or more content pages including the content 317 and 319 may be scrolled according to a user's input (e.g., scroll, touch, tap).

As the display area is expanded, the first screen 327 may be changed to and displayed as the second screen 329. The scaled content 319 may be obtained based on the expansion size (or ratio) of the display area. For example, the whole content 317, including the first display portion in the first screen 327, may be scaled according to the expansion size (or ratio) of the display area to thus obtain the scaled content 319. For example, the second display portion (the second content page) included in the second screen 329 may include objects by scaling (e.g., rearranging or resizing) the objects (e.g., a text, an image, or a video) in the first display portion (the first content page) included in the first screen 327 according to the size (or the ratio) of the changed display area.

If the size of the display area is changed and accordingly the screen size is changed (e.g., expanded or reduced), the content 317 may be scaled up or scaled down in response to the changed display area size (or ratio). For example, if the display area is expanded widthwise, the screen size may be expanded widthwise and the horizontal length and the vertical length of the scalable object 332 and 342 in the content 317 may be adjusted, in response to the expansion size (or ratio) of the display area. Based on the expansion size (or ratio) of the display area, the horizontal length and the vertical length of the text area may be adjusted, and the text may sequentially fill in and be rearranged in the corresponding area. Attributes (e.g., size, color, font) of the text may be maintained in rearranging the text.

A part corresponding to the display area size after the expansion in the scaled content 319 may be designated as the second display portion to be included in the second screen 329 and displayed through the post-expansion display area. The second display portion may be the part corresponding to the first display portion of the content 317 before the scaling, in the scaled content 319.

To designate the second display portion to be included in the second screen 329, the content display reference may be adjusted (or moved). If the content display reference is not adjusted, some content being displayed before the screen expansion may exceed the screen or the content may be unfocused, as shown in FIG. 3A.

FIG. 3B illustrates the content display (or movement) based on the reference object 332.

The reference numeral 332 illustrates the reference object of the first display portion of the content 317 included in the pre-expansion first screen 327. The reference object 332 may be used as the reference element for the content display.

Based on the reference object 332 of the first screen 327, the second display portion to be included in the second screen 329 of the scaled content 319 may be determined.

As mentioned above, if the display area is expanded and accordingly the screen is expanded, the content 317 may be scaled. For example, objects 332 and 342 of the image or video type among the content elements of the content 317 may be scaled (scaled-up) according to the display area expansion size (or ratio). In a text-type object, a text area may be scaled (scaled-up) and expanded, and characters (e.g., a letter, a number, a symbol, a blank, a word, a sentence) may be displayed by sequentially rearranging and filling with them in the expanded text area, in the same format (e.g., a size, a style, a blank, paragraph arrangement) as the pre-expansion display area.

If the display area is expanded, the range of the second display portion (the second content page) may be designated in the content 319 to be included in the second screen 329 based on the reference object 332. The range of the second display portion may be set based on the reference object 332 in the first screen 327. The reference object 332 may be displayed at a reference position (a physical reference position, e.g., the top of the display area) of the pre-expansion display area. For example, the second display portion may be set to include the first object 337 corresponding to the reference object 332 and second object 347 corresponding to the object 342 of the scaled content 319. The second display portion may be included in the second screen 329 and displayed through the scaled display area.

FIG. 3C is a diagram illustrating example content display (or movement) based on a reference word 370 and 375 according to various embodiments.

A reference numeral 360 illustrates the first screen including the first display portion (the first content page) of the content 350. Reference numerals 362 and 364 illustrate the second screen including the second display portion (the second content page) of scaled contents 352 and 354.

The reference numeral 360 illustrates the first screen before the expansion. The first screen 360 may be displayed in the pre-expansion display area. The reference numerals 362 and 364 illustrate the second screen after the expansion. The second screen 362 and 364 may be displayed in the post-expansion display area. The reference numeral 370 illustrates the reference word of the first display portion of the content 350 displayed in the pre-expansion first screen 360. The reference word 370 may be used as the reference element for the content display.

The first screen 360 including the first display portion (the first content page) of the content 350 may be displayed through the pre-expansion display area.

If the display area is expanded and the screen size is changed, the content 350 may be scaled to obtain the scaled content 352 and 354.

If the pre-expansion first screen 360 is changed to the post-expansion second screen 362 and 364, the second display portion (the second content page) may be set in the scaled content 352 and 354 based on the reference word 370. The reference word 370 may be included in the pre-expansion first screen 360. The reference word 370 in the first screen 360 may be displayed at the reference position (e.g., a zero point, a start point) of the display area. The display reference of the content 352 and 354 may be adjusted based on the reference word 370. If the display reference is not adjusted, the position of the reference word 370 (sapien) may not match the reference position of the expanded display area in the scaled content 352.

In this case, as shown, the content 352 and 354 may move to place a sentence including the reference word 370 to correspond to the reference position (e.g., the uppermost line of the second screen 364) of the expanded display area. The reference element may be reset according to the movement of the content 352 and 354. For example, the content 352 and 354 may move to place a sentence including the reference word 370 in the first screen 360 to correspond to the reference position (e.g., the uppermost line of the second screen 364) of the expanded display area, and the sentence including the reference word 370 may be set to the reference line. A display portion to be included in the second screen 364 of the content 354 may be set based on the reference line. As another example, the first word 375 of the sentence including the reference word 370 may be set to a new reference word. A display portion to be included in the second screen 364 of the content 354 may be set based on the new reference world 375.

According to various embodiments, the continuity of the content display, and the content focus may be maintained by adjusting the content display reference according to the resize of the display area. Continuous content viewing experience may be provided to the user before/after the resize of the display area.

In various embodiments, if the display area is changed (e.g., expanded/reduced) to the second size while the first portion of the content is displayed in the display area of the first size, the content may be moved and displayed in the display area where the second display portion of the content is changed to the second size.

For example, the content may be moved based on at least one of a reference position (e.g., a start point displayed at the top of the display area before the resize), a reference object (e.g., an object of the image or video type displayed at the top of the display area before the resize), a first paragraph of a text type object (e.g., a text first paragraph displayed at the top of the display area before the resize), at least part of the image or video type object (e.g., an object portion displayed at the top of the display area before the resize), a reference word (e.g., a first word displayed at the top of the display area before the resize), a reference line (e.g., a sentence displayed at the top of the display area before the resize), or a combination thereof, among the elements in the content.

The processor 120 may control the display to display the first element corresponding to the reference element of the first screen to correspond to the reference position of the area changed into the second size by moving the content.

The processor 120 may be configured to move the content in the second direction (e.g., the other of the widthwise direction and the lengthwise direction) perpendicular to the first direction (e.g., one of the widthwise direction and the lengthwise direction) in which the size of the area is expanded or reduced.

The processor 120 may determine an offset which is a movement degree of the content based on any one of the type of the element (e.g., the reference element) in the first screen, the position of the element and user setting related to the screen display.

If the first element in which the element is rearranged or resized in the first screen is not included in the second screen, the processor 120 may determine the offset for including the first element in the second screen. The processor 120 may move and display the content based on the offset.

The processor 120 may additionally move and display the content in the first direction (e.g., the widthwise direction) in which the size of the area is expanded or reduced. The content may be moved based on at least one of a margin of the area, the expansion direction of the area, an expansion speed of the area, the reduction direction of the area and a reduction speed of the area.

Figure 4A:
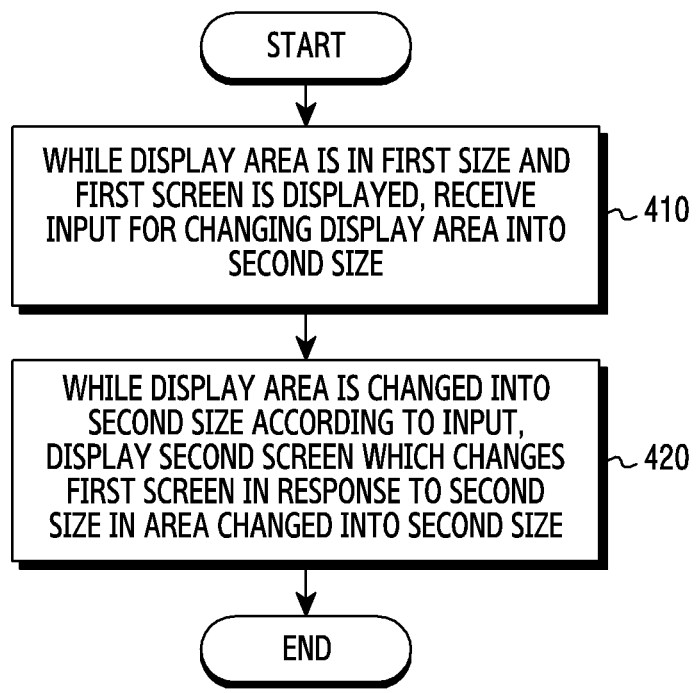
FIG. 4A is a flowchart illustrating an example screen control method according to various embodiments.
Figure 4B:
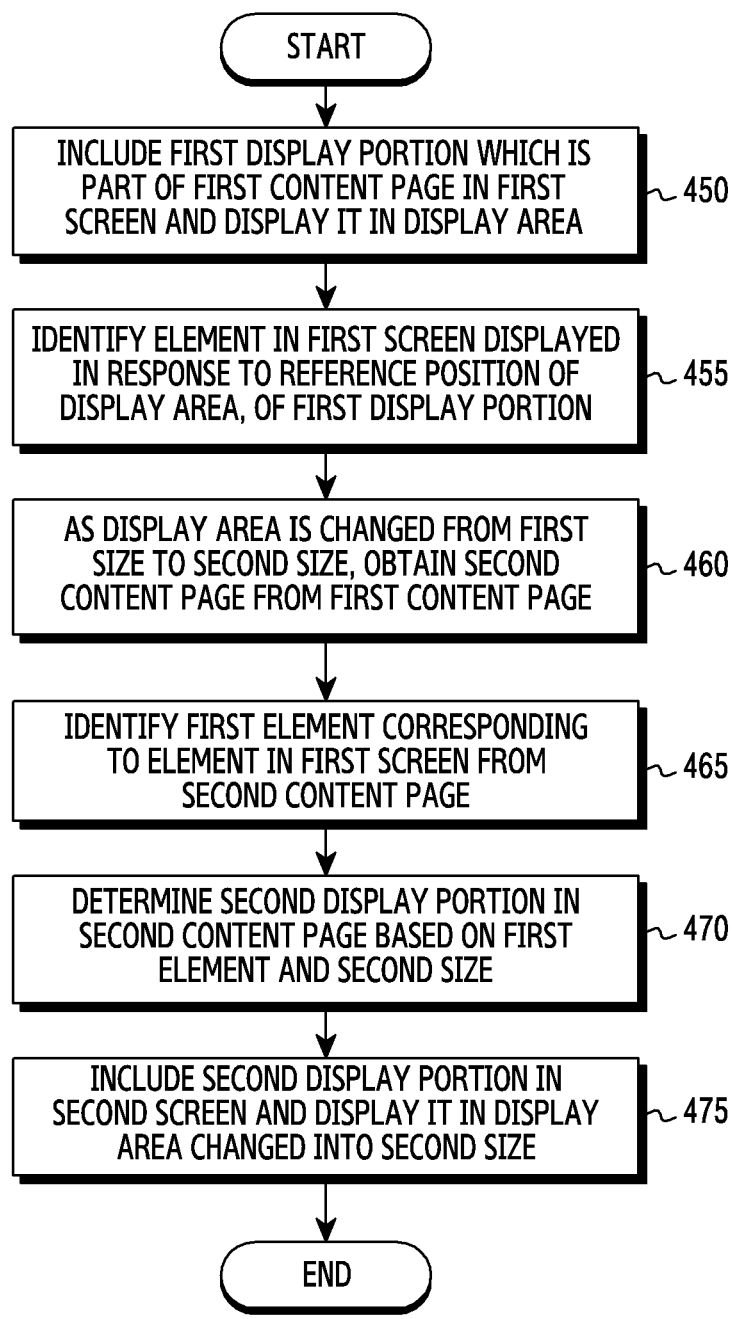
FIG. 4B is a flowchart illustrating an example screen control method according to various embodiments.

FIG. 4A and FIG. 4B are flowcharts illustrating an example screen control method according to various embodiments.

Referring to FIG. 4A, the screen control method according to various embodiments may include operation 410 and operation 420. For convenience, it is assumed that each operation is carried out by the processor 120 of FIG. 1.

In operation 410, while the display area exposed to the outside of the electronic device 100 is in the first size and the first screen is displayed in the display area, the processor 120 may receive an input for changing the display area into the second size.

In operation 420, while the display area is changed into the second size according to the input, the processor 120 may display the second screen which changes the first screen to correspond to the second size in the area changed into the second size.

The second screen may include the first element corresponding to the element in the first screen and the second element in the content, among the plurality of elements in the content.

The second element may be different from the element in the first screen, and may not be displayed in the area while the area is in the first size.

If the element in the first screen is of the text type, a text corresponding to the element may be rearranged and included in the second screen.

If the element in the first screen is of the image or video type, an image or at least part of a video corresponding to the element may be resized and included in the second screen.

The element in the first screen may be displayed at the top of the area of the first size. The first element in the second screen may be displayed at the top of the area changed into the second size. The second element in the second screen may be displayed at the bottom of the area changed into the second size.

A display portion including the first element and the second element in the content may be determined based on any one of the type of the element in the first screen, the position of the element and the user setting relate to the screen display.

The element in the first screen may be displayed to correspond to the reference position of the area. The first element in the second screen may be displayed to correspond to the reference position of the area changed into the second size.

The processor 120 may display the first element in response to the reference position of the area changed into the second size by moving the content.

The processor 120 may move and display the content in the second direction (e.g., the lengthwise direction) perpendicular to the first direction (e.g., the widthwise direction) in which the size of the area is expanded or reduced.

The processor 120 may determine an offset which is the movement degree of the content based on any one of the type of the element in the first screen, the position of the element and the user setting related to the screen display. If the first element in which the element is rearranged or resized in the first screen is not included in the second screen, the processor 120 may determine the offset for including the first element in the second screen, and move the content based on the offset.

If the display portion which is a part of the first content page is displayed in the area, the processor 120 may obtain the second content page corresponding to the first content page. The processor 120 may move and display the content, based on comparison between an area of a top hidden portion of the first content page and an area of a top hidden portion of the second content page.

The processor 120 may move and display the content, to keep the area of the top hidden portion of the first content page and the area of the top hidden portion of the second content page substantially the same.

The processor 120 may include the first display portion which is the part of the first content page in the first screen and display it in the area. The processor 120 may identify the element in the first screen displayed in response to the reference position of the area, of the first display portion. As the area is changed from the first size to the second size, the processor 120 may obtain the second content page corresponding to the second size from the first content page. The processor 120 may identify the first element corresponding to the element in the first screen in the second content page, and determine the second display portion in the second content page based on the first element and the second size. The processor 120 may include the second display portion in the second screen and display it in the area changed into the second size.

The processor 120 may additionally move and display the content in the first direction. The processor 120 may move and display the content based on at least one of the margin of the area, the expansion direction of the area, the expansion speed of the area, the reduction direction of the area and the reduction speed of the area.

Referring to FIG. 4B, an example screen control method according to various embodiments may include operations 450, 455, 460, 465, 470 and 475. For convenience, it is assumed that each operation is carried out by the electronic device 101 of FIG. 1.

In operation 450, the electronic device 100 may include the first display portion which is the part of the first content page in the first screen and display it in the display area. The first content page may be understood as a page (e.g., a web page, a wired/wireless internet page, an application page) including part of the content.

In operation 455, the electronic device 100 may identify the element in the first screen displayed corresponding to the reference position of the display area, of the first display portion. For example, the element may be the reference element for setting the content display portion.

In operation 460, as the display area is changed from the first size to the second size, the electronic device 100 may obtain the second content page corresponding to the second size from the first content page. The second content page may scale the first content page to correspond to the second size.

In operation 465, the electronic device 100 may identify the first element corresponding to the element in the first screen from the second content page.

In operation 470, the electronic device 100 may determine the second display portion in the second content page based on the first element and the second size.

In operation 475, the electronic device 100 may include the second display portion in the second screen and display it in the area changed into the second size.

Figure 5A:
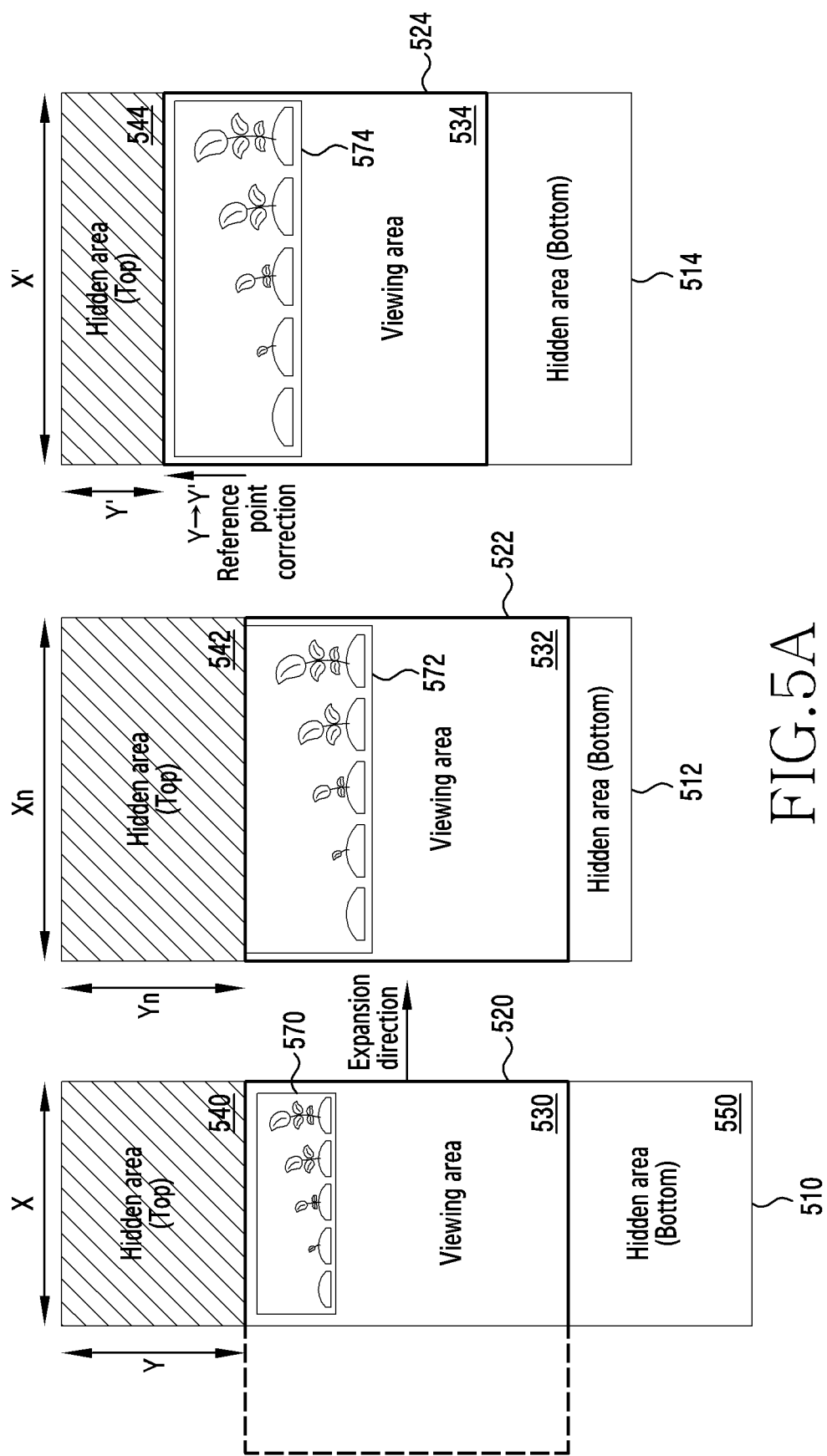
FIG. 5A and FIG. 5B are diagrams illustrating examples of screen control according to various embodiments.

FIG. 5A is a diagram illustrating example screen control according to various embodiments, and illustrates an example scheme for adjusting a content display reference before/after expansion.

In FIG. 5A, a first content page 510 including content is illustrated. Reference numerals 512 and 514 illustrate a second content page including the scaled content. The content pages 510, 512, and 514 may include a plurality of objects (e.g., texts, images, videos).

The second content pages 512 and 514 may correspond to the first content page 510. The second content pages 512 and 514 may process (e.g., scale) the first content page 510 according to the changed size (or ratio) of the display area. Objects in the first content page 510 may be scaled (e.g., rearranged or resized) and included in the second page 512 and 514.

Some display portion 530, 532, and 534 of each content page 510, 512, and 514 may be included in each page 520, 522, and 524 and displayed through the display area.

If the display area is changed (e.g., expanded or reduced) from the first size to the second size, the content page 510 may be scaled. For example, if scaling the content, a text in the content page 510 may be rearranged according to a size of the scaled text area, or an image or a video in the content page 510 may be resized according to the scaling rate.

The reference numeral 520 illustrates the pre-expansion first screen. The first screen 520 may be displayed in the pre-expansion display area. The reference numeral 522 illustrates the screen which is expanding. The second screen 524 may be displayed in the post-expansion display area. The content display reference may be adjusted and displayed in the post-expansion second screen 524.

The first content page 510 may include the first display portion 530, a top hidden portion 540 and a bottom hidden portion 550 The pre-expansion first screen 520 may display the first display portion 530 which is a part (e.g., an intermediate portion) of the first content page 510. For example, if the first content page 510 is scrolled by the user, content of the some display portion 530 of the first content page 510 may be displayed in the pre-expansion first screen 520, according to a scroll position. The top hidden portion 540 may be positioned above the display portion 530, and the bottom hidden portion 550 may be positioned below.

The scroll position may change if the screen is unfolded while the pre-expansion first screen 520 of the display 110 is displayed. In this case, it may be inconvenient to re-locate the scroll position viewed by the user.

An embodiment may maintain the scroll position regardless of the screen switch according to the resize of the display area by adjusting the content display reference.

The second screen 524 including the second display portion 534 which is a part of the second content page 514 may be displayed in the post-expansion display area.

As shown in the pre-expansion first screen 520, the expanding screen 522 and the post-expansion second screen 524, if the screen of the display 110 is expanded widthwise, content elements at the top of the display portion 530 in the pre-expansion first screen 520 may be moved upward (e.g., the Y-axis direction) as the horizontal length of the screen changes, and the content may be dropped from the display portion 530 or separated from the top hidden portion 540 above the display portion 530.

The top hidden portion 540 may be a portion including the uppermost point (e.g., a zero point, a Y-axis zero point, a point designating the uppermost pixel line) of the first content page 510. The display portion 530 may be a portion including an intermediate point of the first page 510. The display reference (e.g., the Y-axis reference point) designating the display portion 530 may correspond to the intermediate point of the first content page 510.

Referring to the pre-expansion first screen 520, if the pre-expansion first screen 520 includes the first display portion 530 of the first content page 510, the pre-expansion first screen 520 may not include (not display) the uppermost point of the first content page 510, and may include (display) the intermediate point of the first content page 510. In this case, if the pre-expansion first screen 520 is expanded or reduced, a width change of the content (e.g., a text, an image, etc.) being displayed on the pre-expansion first screen 520 may occur. Thus, the range of the content included in the top hidden portion 540 may change.

Referring to the expanding screen 512, if the display area is expanded widthwise, the horizontal length of the screen changes (the screen expands to change from 520 to 522) and at least part of the displayed content may be scrolled up to the top hidden portion 540 and displayed.

The electronic device 100 may constantly maintain the area of the top hidden portion 540, 542, and 544 above the display portion 530, 532, and 534 and thus maintain the range of the content displayed in the screen 530, 532, and 534 by adequately adjusting the display reference (e.g., the vertical axis reference point) for setting the display portion in the content.

As such, by constantly maintaining the area of the top hidden portion 540, 542, and 544, the range of the content included in the display portion 530, 532, and 534 may be steadily maintained regardless of the resize of the display area or its screen resize. The area of the pre-expansion top hidden portion 540 may be continuously maintained in the expanding state and the expansion complete state.

For example, if the top hidden portion 540 includes only the text, the position of the content display reference (e.g., the content start point) may be maintained, by making the areas of the top hidden portions 540, 542, and 544 the same.

In the text, a text amount included in the same area may be constant even though the screen is expanded.

Accordingly, if the position of the display reference is maintained at the same height before/after the screen expansion, without adjusting the display reference, the content viewed to the user may differ or the content focus may be lost before/after the screen expansion.

The reference numeral 522 illustrates the expanding screen, without adjusting the display reference.

According to an embodiment, the continuity of the content and the user-centered content focus may be maintained, by adjusting the content display reference before/after the expansion.

The reference numeral 524 illustrates the expansion completed second screen, with the display reference adjusted.

As shown in FIG. 5A, if the first display portion 530 displayed in the pre-expansion first screen 520 is the intermediate portion of the first content page 510, the display portion 532 included in the expanding screen 522 and the second display portion 534 included in the post-expansion second screen 524 may be the intermediate portion of the second content page 512 and 514 expanded from the first content page 510.

The electronic device (e.g., the electronic device 100 of FIG. 1) according to an embodiment may adjust the display reference, based on comparison between the area of the top hidden portion 540 of the first content page 510 and the area of the top hidden portion 542 and 544 of the resized (e.g., expanded or reduced) first content page 512 and 514, to improve the problem of the content display according to no adjustment of the display reference.

Referring to FIG. 5A, the adjustment scheme of the content display reference using the area of the top hidden portion is explained in further detail as follows.

The electronic device according to an embodiment may adjust the display reference, to keep the area of the top hidden portion 540 of the first content page 510 and the area of the top hidden portion 544 of the second content page 514 resized from the first content page 510 the same.

For example, in the screen expansion of the electronic device, the electronic device may adjust the content display reference to keep the area of the top hidden portion 540 before the expansion and the area of the expanded top hidden portion 544 substantially the same.

If the areas of the two top hidden portions 540 and 544 are maintained the same, the range of the content included in the pre-expansion top hidden portion 540 and the range of the content included in the post-expansion top hidden portion 544 may be maintained constantly.

For example, if the content included in the pre-expansion top hidden portion 540 is a text, the display reference may be adjusted before/after the screen expansion to maintain the areas of the two top hidden portions 540 and 544 the same, and thus the content range included in the two top hidden portions 540 and 544 may be maintained constantly.

The electronic device 100 may adjust the display reference (e.g., the vertical axis reference point) of the post-expansion display portion 534 to maintain the areas of the two top hidden portions 540 and 544 substantially the same. By adjusting the content display reference, the display reference (e.g., the start point) of the display portion 534 succeeding the post-expansion top hidden portion 544 may be controlled to position at the reference position (e.g., the vertical axis reference point) of the display area.

If the content display reference is not adjusted, the display positions or the display states of the first object 570 in the pre-expansion first screen 520 and the first object 572 in the expanding first screen 520 may not correspond to each other as shown. By adjusting the content display reference, the display positions or the display states of the first object 570 in the pre-expansion first screen 520 and the first object 574 in the post-expansion first screen 524 may correspond to each other as shown.

For example, if the top of the pre-expansion first display portion 530 includes the first object 570 (e.g., an image which is a scalable object) in the content, the expanded first object 574 may be displayed at the top of the post-expansion second display portion 534.

Hence, the continuity of the content included in the two display portions 530 and 534 before/after the screen expansion, and the user-centered content focus may be maintained.

In various embodiments, the content display reference may be the reference point (e.g., the vertical axis reference point). For example, the vertical axis reference point may be referred to as any one of a Y-axis zero point, a Y-axis reference point, a lengthwise reference point, a scroll reference point, and a Y-axis coordinate value.

In various embodiments, the content display reference may be any one of the reference word, the reference line, the reference object, or a part of the reference object displayed at the reference position (e.g., the top of the display area) of the display area.

As above, if the display area is resized, during the display of the intermediate point in the content, the content display reference before/after the expansion may be adjusted based on the area of the top hidden portions preceding the display portion.

If the horizontal length of the display portion 530 displayed on the pre-expansion screen 520 is X, and the vertical length is Y, the horizontal length of the display portion 532 expanding in real time may be defined as X1, X2, X3, . . . , Xn, and the vertical length may be defined as Y1, Y2, Y3, . . . , Yn. The horizontal length of the display portion 534 of the expansion completed state may be defined as X', and the vertical length may be defined as Y'.

The area of the top hidden portion 540 before the expansion may be expressed as X*Y, the area of the expanding top hidden portion 542 may be expressed as X1*Y1, X2*Y2, X3*Y3, . . . , Xn*Yn, and the area of the top hidden portion 544 of the expansion completed state may be expressed as X'*Y'.

The electronic device may maintain the area of the expanded top hidden portion 542 and 544 the same as the area of the pre-expansion top hidden portion 540, by adjusting the content display reference (e.g., the vertical axis reference point) based on X and Y.

In the screen expansion, the following Equation 1 may be established in relation to the area change of the top hidden portion 540, 542, and 544.

$$X*Y=X1*Y1=X2*Y2=X3*Y3=\ldots=Xn*Yn=X'*Y'  \quad \text{Equation 1}$$

For example, if the value of the pre-expansion vertical axis reference point (e.g., the height) is 0, the electronic device may control the value of the vertical axis reference point in the screen expansion not to fall below 0. The electronic device may change the value of the vertical axis reference point in response to the screen expansion degree (or expansion distance) and thus enable the user not to miss the content context before/after the screen expansion.

In addition, even in the screen reduction, the display reference may be adjusted in real time, using the adjustment scheme of the vertical axis reference point considering the area of the top hidden portion.

If the screen is reduced from the post-expansion state to the pre-expansion state, the content context may be maintained by applying the value of the vertical axis reference point in reverse based on the same scheme. For example, in the reduction of the display area, the screen may be displayed in order of 524, 522, and 520. In this case, the area of the top hidden portion 544 before the reduction may be expressed as X'*Y', the area of the top hidden portion 542 being reduced may be expressed as Xn*Yn, X3*Y3, X2*Y2, X1*Y1, and the area of the top hidden portion 540 of the reduction completed state may be expressed as X*Y.

The electronic device may maintain the area of the reduced top hidden portion 540 the same as the area of the top hidden portion 544 before the reduction by adjusting the vertical axis reference point based on X', Y'.

In the screen reduction, the following Equation 2 may be established in relation to the area change of the top hidden portion 544, 542, and 540.

$$X'*Y'=Xn*Yn=\ldots=X3*Y3=X2*Y2=X1*Y1=X*Y  \quad \text{Equation 2}$$

Figure 5B:
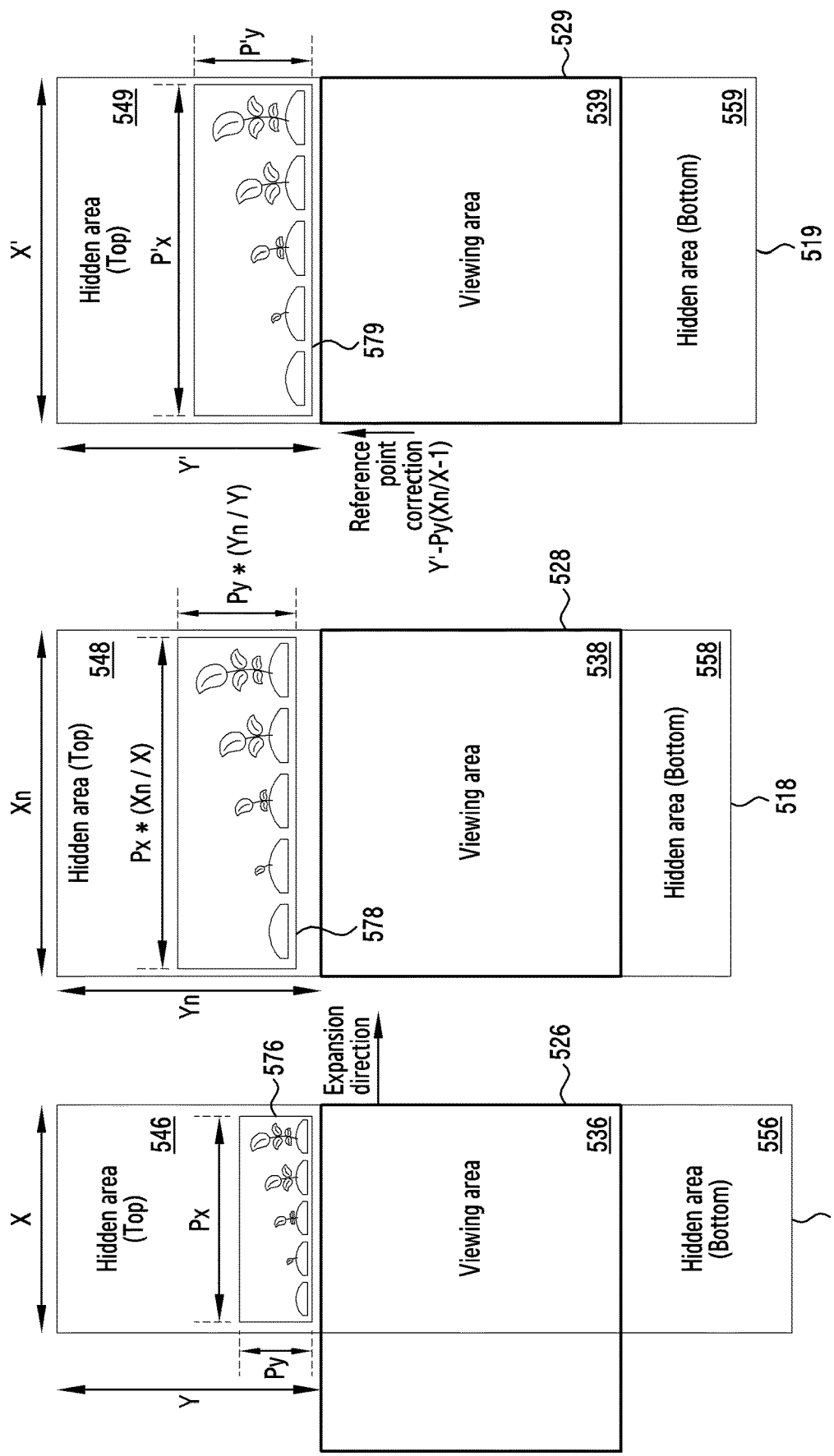

FIG. 5B is a diagram illustrating example screen control according to various embodiments, which is to explain the adjustment of the content display reference before/after the expansion in relation to content including a scalable object.

A reference numeral 526 illustrates the pre-expansion first screen. A reference numeral 528 illustrates the screen being expanded, with the reference not adjusted. A reference numeral 529 illustrates the post-expansion second screen, with the display reference adjusted.

The pre-expansion first screen 526 may display a display portion 536 which is a part of the first content page 516. The first content page 516 may include the display portion 536, a top hidden portion 546 and a bottom hidden portion 556.

In the screen expansion (or the display area expansion), the first content page 516 may be scaled according to the expanded screen size (or ratio). The expanded content page 518 may include a top hidden portion 548, a display portion 538 and a bottom hidden portion 558. The screen 528 being expanded may display the display portion 538 which is the part of the expanded content page 518.

The top hidden portion 546 positioned above the display portion 536 displayed on the pre-expansion first screen 526 may include a scalable object (e.g., an image, a video, a symbol, etc.). FIG. 5B illustrates an image 576 as the scalable object. The display portion 536 positioned below the image 576 may display a text.

As shown, if the screen is expanded widthwise in response to the expansion of the display area, the text may be rearranged and display according to match the expanded screen size. For example, in the screen expansion, only the amount of the text included in the corresponding area may increase without changing the text size.

Unlike the text, the scalable object such as an image or a video needs to expand according to the expanded screen ratio, in the widthwise expansion. The scalable object may be scaled according to the screen resize. For example, if the screen is expanded, the scalable object such as an image may be scaled up according to the changed screen ratio.

If the pre-expansion first screen 526 is expanded widthwise, the horizontal length of the pre-expansion first screen 526 may increase, and the scalable object may be scaled up according to the expanded screen ratio to thus change the size of the object. In this case, content in some area expanded in proportion to the expansion of the screen size may be separated to other area. For example, as shown in the expanding screen 528, the image 578 may be scaled up based on the expanded screen ratio, according to the screen expansion, and as the display portion 538 is expanded, part of the text included in the pre-expansion display portion 536 may be separated and pushed up to the top hidden portion 548.

According to an embodiment, the content display reference (e.g., the vertical axis reference point) in the screen resize may be adjusted to prevent and/or reduce some content of the display portion from being separated to the hidden portion.

Referring to FIG. 5B, the content display reference adjustment scheme for preventing and/or reducing the content separation is described in greater detail as follows.

For example, if the pre-expansion top hidden portion 546 includes the image 576, the electronic device 100 may calculate a vertical axis increment of the expanded image 578, adjust (or move) the reference point which is the display reference lengthwise, and thus exclude the calculated vertical axis increment from the top hidden portion 548, in the screen expansion. As such, the vertical axis increment of the image 578 scaled at the same ratio as the screen expansion ratio may be adjusted.

If the horizontal length of the area corresponding to the image 576 included in the top hidden portion 546 is defined as Px and the vertical length is defined as Py, the vertical axis reference point which is the display reference may be adjusted to exclude the vertical expansion portion $Py*(Xn/X-1)$ of the image 576 of the top hidden portion 546 from the screen.

In this case, Equation 3 may be established.

pre-expansion $Y$-axis reference point $= Y$ expanding $Y$-axis reference point $= Yn - Py*(Xn/X-1)$ post-expansion $Y$-axis reference point $= Y' - Py*(X'n/X-1)$     Equation 3

The reference numeral 529 illustrates the expanded second screen, with the display reference adjusted in the content. The expanded second content page 519 may include a top hidden portion 549, a display portion 539 and a bottom hidden portion 559. A vertical axis increment of a first image 579 in the top hidden portion 549 may be excluded from the top hidden portion 549. As the vertical axis increment of the image 579 in the top hidden portion 549 positioned above the display portion 539 in the second content page 519 of the expanded state is compensated, the vertical axis reference point which is the display reference may be adjusted lengthwise. Hence, the display portion 539 corresponding to the pre-expansion display portion 536 may be displayed on the expanded second screen 529.

Some electronic devices (e.g., a smart phone) may have an area which is stationary and viewed all the time regardless of the content movement or the screen expansion such as a status bar or an indicator according to device characteristics. In this case, if calculating the area of the top hidden portion, or calculating the vertical axis increment, the scheme for steadily excluding the corresponding area may be utilized to adjust the vertical axis reference point which is the display reference.

Figure 6A:
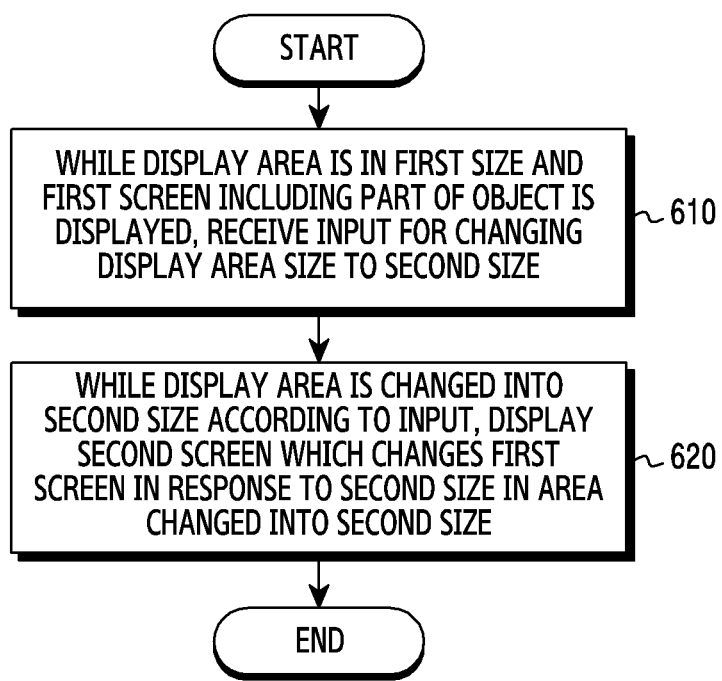
FIG. 6A is a flowchart illustrating an example screen control method according to various embodiments.
Figure 6B:
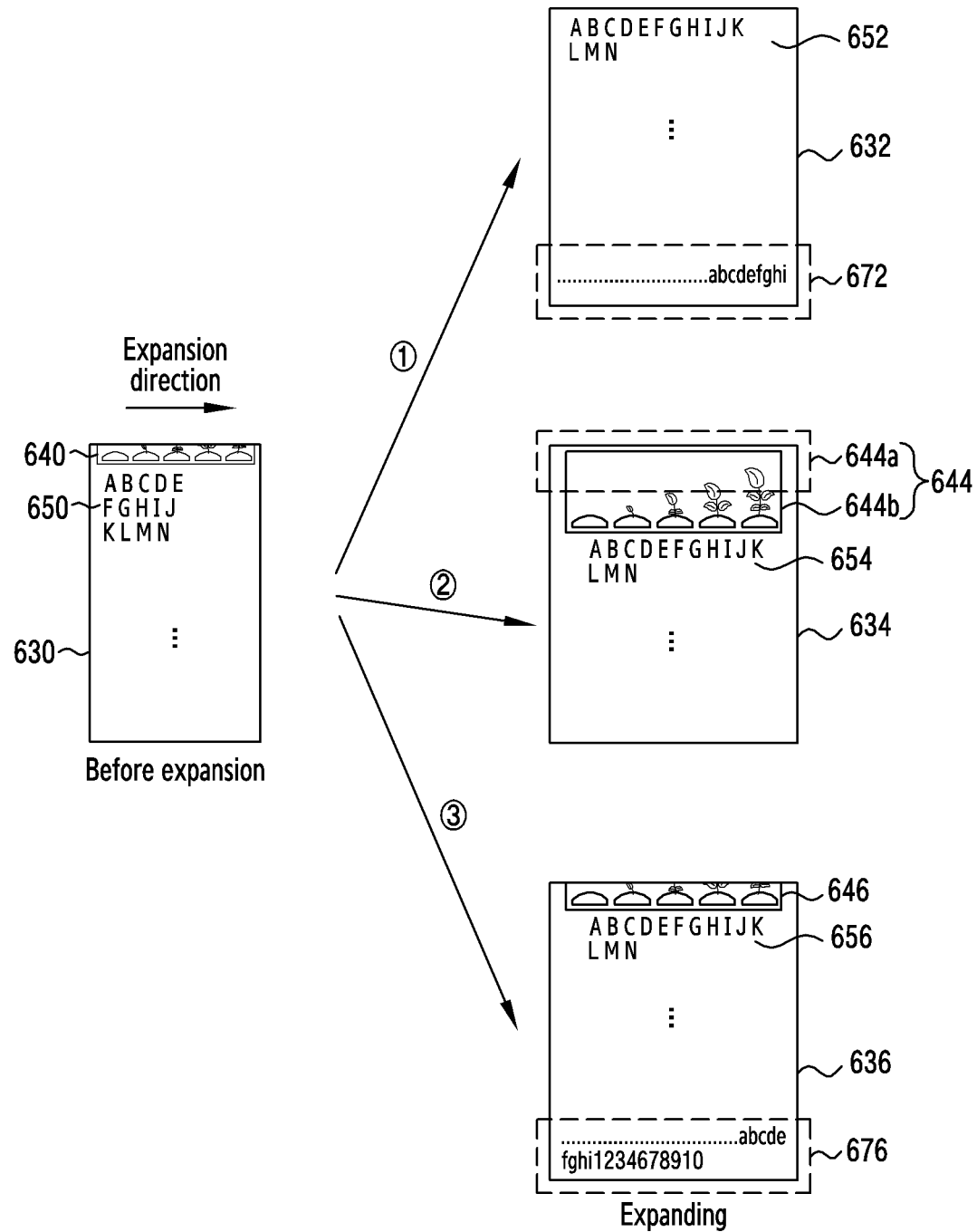
FIG. 6B is a diagram illustrating example screen control according to various embodiments.

FIG. 6A is a flowchart illustrating an example screen control method according to various embodiments. FIG. 6B is a diagram illustrating example screens for explaining the screen control according to various embodiments.

Referring to FIG. 6A, the screen control method according to an embodiment may include operation 610 and operation 620. For convenience, it is assumed that each operation is carried out by the electronic device 101 of FIG. 1.

In operation 610, while the display area is in the first size and the first screen is displayed in the display area, the processor 120 may receive an input for changing the display area into the second size.

In operation 620, while the area is changed into the second size according to the input, the processor 120 may display the second screen which changes the first screen to correspond to the second size in the area changed into the second size.

The second screen may include the first element corresponding to the element in the first screen and the second element in the content, among a plurality of elements in the content.

The second element may be different from the element in the first screen, and may not be displayed in the area if the area is in the first size.

If the element in the first screen is of the text type, a text corresponding to the element may be rearranged and included in the second screen. If the element in the first screen is of the image or video type, an image or at least part of a video corresponding to the element may be resized and included in the second screen.

The element in the first screen may be displayed at the top of the area of the first size. The first element in the second screen may be displayed at the top of the area changed into the second size. The second element in the second screen may be displayed at the bottom of the area changed into the second size.

The display portion including the first element and the second element in the content may be determined based on any one of the type of the element in the first screen, the position of the element, and the user setting relate to the screen display.

The element in the first screen may be displayed to correspond to the reference position of the area. The first element in the second screen may be displayed in response to the reference position of the area changed into the second size.

In an embodiment, the processor 120 may display the first element in response to the reference position of the area changed into the second size by moving the content.

The processor 120 may move and display the content in the second direction perpendicular to the first direction in which the size of the area is expanded or reduced.

The offset which is the movement degree of the content may be determined based on any one of the type of the element in the first screen, the position of the element and the user setting related to the screen display.

If the first element rearranging or resizing the element in the first screen is not included in the second screen, the processor 120 may determine the offset for including the first element in the second screen, and move the content based on the offset.

If the display portion which is the part of the first content page is displayed in the area, the processor 120 may obtain the second content page corresponding to the first content page. The processor 120 may move and display the content, based on the comparison between the area of the top hidden portion of the first content page and the area of the top hidden portion of the second content page.

The processor 120 may move and display the content, to keep the area of the top hidden portion of the first content page and the area of the top hidden portion of the second content page the same.

The processor 120 may additionally move and display the content in the first direction. The processor 120 may move and display the content based on at least one of the margin of the area, the expansion direction of the area, the expansion speed of the area, the reduction direction of the area and the reduction speed of the area.

FIG. 6B is a diagram illustrating example adjustment schemes of the content display reference according to various embodiments.

A first screen 630 may be displayed in a pre-expansion display area of a first size. A second screen (one of 632, 634, and 636) may be displayed in the display area expanded to a second size.

While the display area (e.g., the pre-expansion display area) is in the first size, the first screen 630 including part of a reference object 640 may be displayed in the display area. For example, the first screen 630 may include the part of the first reference object 640 and a second reference object 650. In FIG. 6B, the first reference object is illustrated as an image which is the scalable object, and the second reference object 650 is illustrated as a text.

While displaying the first screen 630 including the part of the first reference object 640 in the display area, the processor 120 may receive an input for expanding the size of the display area to the second size.

If the area is expanded to the second size according to the input, the processor 120 may display the second screen (one of 632, 634, and 636) expanding the first screen 630 corresponding to the second size in the display area expanded to the second size. The second screen (one of 632, 634, and 636) may include at least part (e.g., one of 644a, 644b, and 646) of a first object 644 corresponding to the first reference object 640 of the first screen 630 and/or a second object (one of 672 and 676).

The second object (e.g., 672 or 676) of the second screen (e.g., 632 or 636) is different from the reference object (e.g., 640 or 650) of the first screen 630, and may not be displayed in the display area while the display area is in the first size.

For example, the second screen such as the reference numeral 632 may be displayed in the display area expanded to the second size. The first reference object 640 may not be included in the second screen 632, and the second reference object 650 below the first reference object may be expanded and included in the second screen 632. An object 652 rearranging the text in the second reference object 650 may be displayed at the top of the display area expanded to the second size. The second object 672 not included in the first screen 630 may be included at the bottom of the second screen 632.

For example, the second screen such as the reference numeral 634 may be displayed in the display area expanded to the second size. The substantial entirety of the first reference object may be enlarged according to the second size and displayed at the top of the display area expanded to the second size. The first object 644 enlarging the substantial entirety of the first reference object according to the second size may be included in the top of the second screen 634 and displayed at the top of the display area expanded to the second size. The first object 644 may include the first portion 644a and the second portion 644b. The second portion 644b may correspond to other part of the first reference object, not included in the first screen 630.

An object 654 corresponding to the second reference object 650 in the first screen 630 may be positioned below the first object 644 in the second screen 634.

For example, the second screen such as the reference numeral 636 may be displayed in the display area expanded to the second size. Part of the first reference object 640 may be enlarged according to the second size and displayed at the top of the area expanded to the second size, and the second reference object 650 below the first reference object may be enlarged and included in the second screen 636. An object 656 rearranging the text in the second reference object 650 may be displayed at the top of the display area expanded to the second size. The second object 676 not included in the first screen 630 may be included at the bottom of the second screen 636.

The processor 120 may determine at least part of the first object (e.g., one of 652, 644, and 646) and the second object (e.g., one of 672 and 676) to be included in the second screen (one of 632, 634, and 636) based on any one of the type of the reference object (e.g., 640) in the first screen 630, the position of the reference object (e.g., 640, 650) in the first screen 630, and the user setting related to the screen display.

The processor 120 may adjust the content display reference based on the reference object (e.g., 640) in the content displayed at the top of the first screen 630.

If the content display reference is not adjusted, the pre-expansion first screen 630 and the post-expansion second screen (one of 632, 634, and 636) may lose the continuity of the content display, and the user-centered content focus.

The content display reference may be moved based on the type of the reference object (e.g., 640) in the content, or the position of the reference object (e.g., 640). For example, the reference object may be of the text type, or of the scalable object type (e.g., an image, a video, a banner, an icon, a symbol, etc.) type.

For example, the processor 120 may move and display the content display reference upward by a first offset, not to substantially display the first reference object 640 in the post-expansion second screen 632, and to display the second reference object 650 positioned below the first reference object 640 at the top of the post-expansion second screen 632. If the content display reference is adjusted to display the text which is the second reference object 650, disposed below the image which is the first reference object 640 in the first screen 630, at the top of the second screen 632, the first offset may be adjusted to maintain the movement degree of the text which is the second reference object 650 within a specific range in the first screen 630 and the second screen 632 before/after the expansion, to maintain the continuity of the content or the content focus.

For example, the processor 120 may move downward and display the content display reference, to enlarge and display the substantial entirety of the image which is the first reference object 640 in the expanded second screen 634 according to the screen size.

For example, to enlarge and display part of the image which is the first reference object 640 according to the screen size in the expanded second screen 636, the processor 120 may move upward by a second offset and display the content display reference. The second offset may have a smaller value than the first offset.

Although the first reference object 640 is scaled according to the expanded screen size (or ratio), if the content display reference is not adjusted (e.g., if not moved upward by the second offset, if the scaled first object is displayed as it is without adjusting the display reference), the positions or the display states of the objects displayed at the top of the two screens may not correspond to each other, in the screen before/after the expansion.

The processor 120 may display the first object 646 disposed at the top of the expanded second screen 636 to correspond to the first reference object 640 disposed at the top of the pre-expansion first screen 630 by moving by the second offset and displaying the content display reference.

The content display reference may be moved based on the user setting related to the screen display. For example, a screen expansion mode may be set by the user. The screen expansion mode may be any one of a text first mode, a scalable object (e.g., image) first mode and a display reference hold mode.

For example, if the text first mode is set, the content display reference may be adjusted to display the text first (e.g., to display the object 652 of the text type in the expanded second screen 632) in the screen expansion.

If the scalable object (e.g., image) first mode is set, the content display reference may be adjusted to display the scalable object first (e.g., to display the object 644 of the image type in the expanded second screen 634) in the screen expansion.

If the display reference hold mode is set, the content display reference may be adjusted to display the scaled object (e.g., to display the image which is the first object 646 in the expanded second screen 632) in response to the object at the top (e.g., the uppermost line) of the first screen 630 before the screen expansion.

Figure 7A:
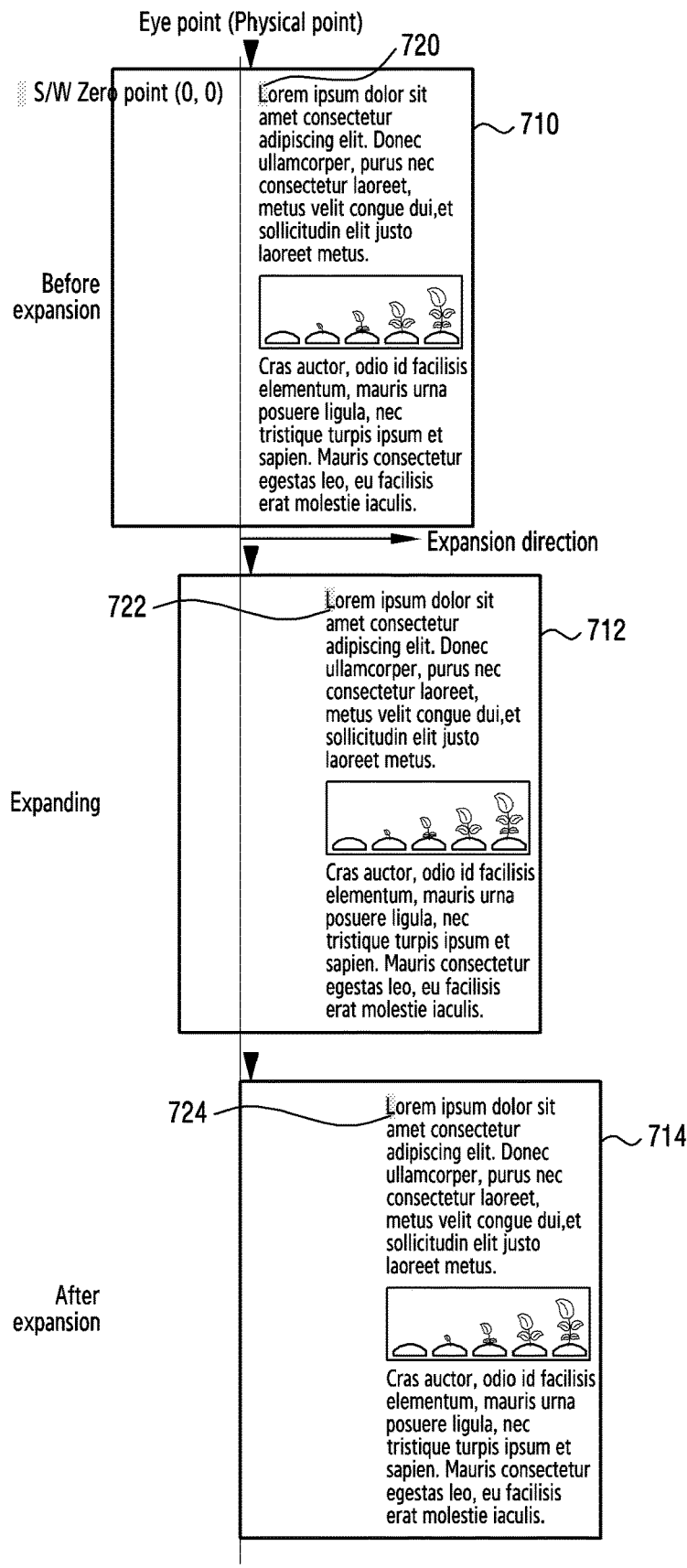
FIG. 7A and FIG. 7B are diagrams illustrating example illustrating example screen control according to an embodiment.
Figure 7B:
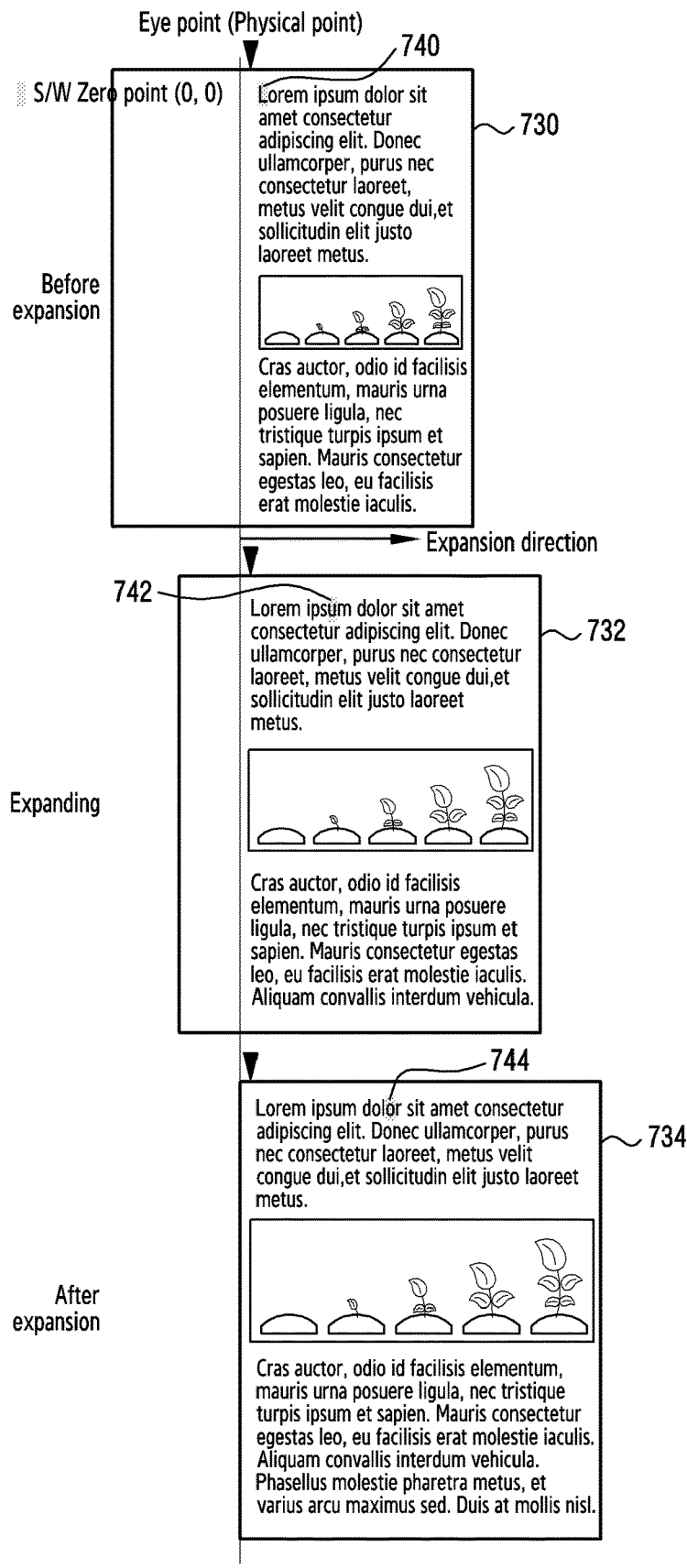

FIG. 7A and FIG. 7B are diagrams illustrating example screen control according to various embodiments, which illustrate adjusting a content display reference widthwise before/after the expansion.

FIG. 7A is a diagram illustrating the screen before/after the expansion if the content display reference (e.g., a zero point) is not updated. FIG. 7B is a diagram illustrating the screen before/after the expansion if the content display reference (e.g., a zero point) is updated.

As shown in FIG. 7A, a form factor which pushes a new area out from the left as a screen 710 is expanded to the right may need to update a display reference point 720, 722, and 721 (e.g., a zero point) of content being displayed on a screen 712 and 714 expanded by the unfolded and expanded area.

FIG. 7B illustrates updating a display reference point 740, 742, and 744 according to an expansion degree of a screen 730, 732, and 734, as the screen is gradually expanded. It is possible to measure the screen expansion degree (or a screen expansion distance) in updating the display reference point 740, 742, and 744 and thus move the display reference point by a corresponding area.

In this case, it may be difficult to precisely measure the screen expansion degree in real time. The measurement value may have an error, and delay may occur in processing the screen update based on the measurement value. Due to the measurement value error or the processing delay, the moved display reference point may not precisely match the screen expansion degree to cause a gap. As the physical display reference point changes in the screen expansion, the user may feel screen vibration or shaking. In a nonelectric driving scheme (e.g., a manual scheme implemented through a spring, or a semiautomatic expansion driver scheme), the screen vibration or shaking degree experienced by the user may exhibit even worse.

According to various embodiments, the stable screen may be implemented by compensating for the screen vibration/shaking caused by the resize of the display area or its corresponding screen resize by adjusting the content display reference point widthwise.

Figure 8A:
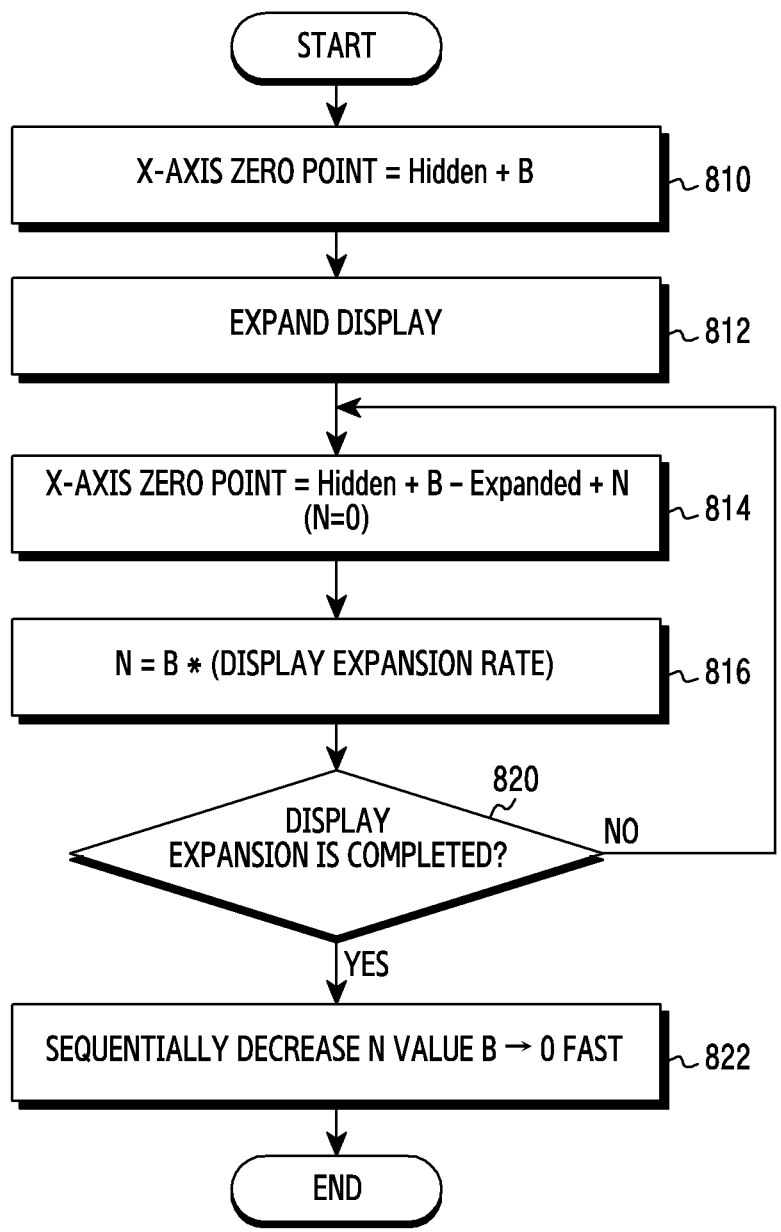
FIG. 8A and FIG. 8B are flowcharts illustrating example screen control methods according to various embodiments.
Figure 8B:
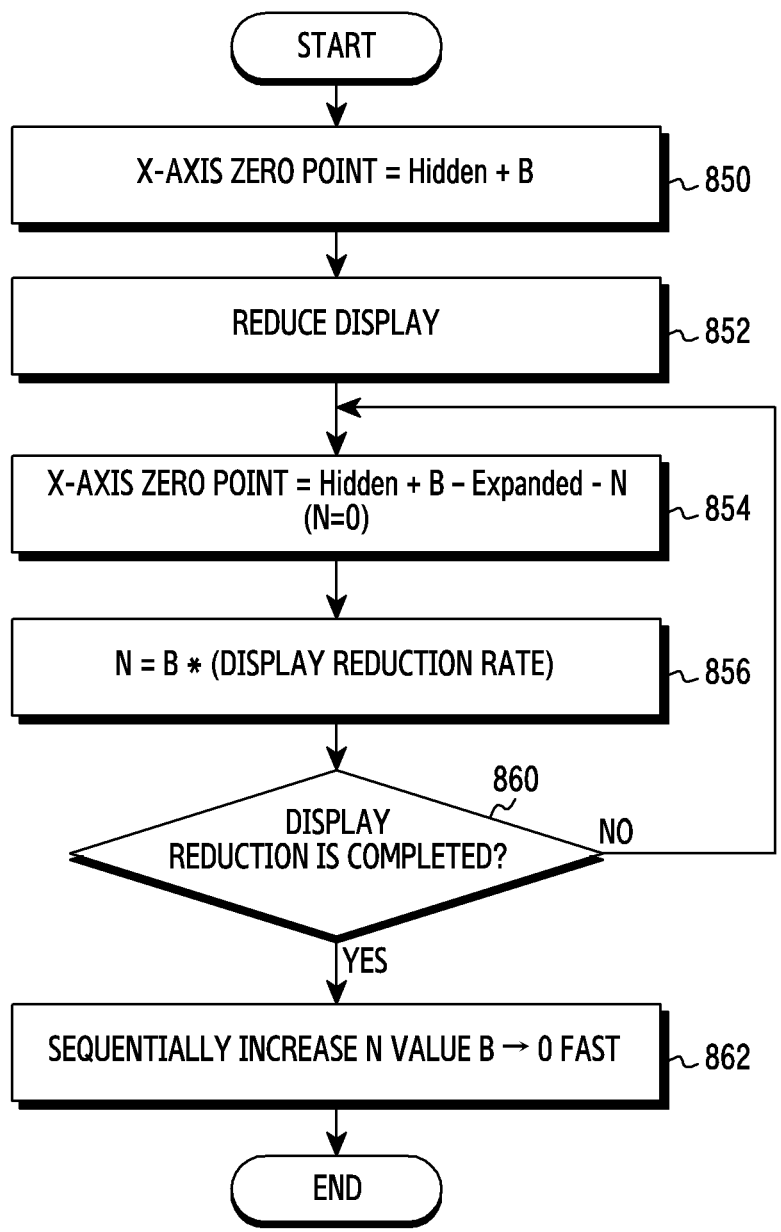
Figure 9:
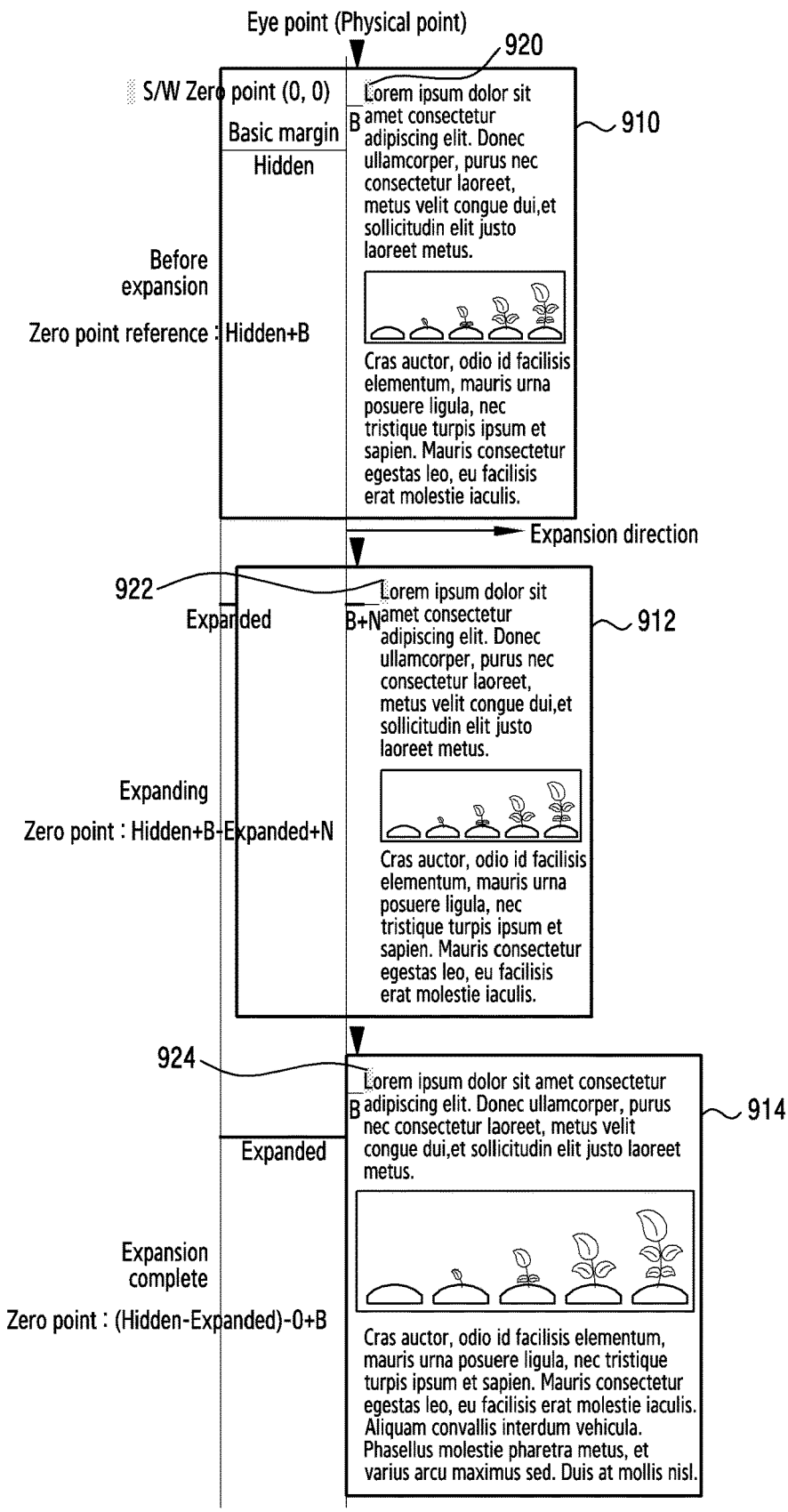
FIG. 9 is a diagram illustrating example screen control according to various embodiments.

FIG. 8A and FIG. 8B are flowcharts illustrating example screen control methods according to various embodiments. FIG. 9 is a diagram illustrating an example screen control according to various embodiments.

The embodiments of FIGS. 8A, 8B and 9 relate to a scheme for adjusting a horizontal axis reference point.

An embodiment may reduce the vibration/shaking phenomenon by providing a graphic effect in the same direction as the expansion direction, or may disable the user to recognize the vibration/shaking phenomenon, in the screen expansion.

For example, the graphic effect may be a scheme which moves the horizontal axis reference point and the whole content displayed on the screen in the same direction as the expansion direction, faster than the expansion speed, and restores the horizontal axis reference point right after (or right before) the expansion complete. The horizontal axis reference point may be referred to as any one of an X-axis zero point, an X-axis reference point, or a widthwise reference point.

Right before/after the expansion complete may indicate with a specific time (e.g., 1 second) from the expansion complete time. The vibration/shaking phenomenon before/after the expansion may be adjusted by the graphic effect.

Corrections of the horizontal axis reference point (e.g., a horizontal axis zero point) and the vertical axis reference point (e.g., a vertical axis zero point) may be applied together. For example, by adjusting the content display reference point (e.g., a vertical axis zero point) lengthwise according to the screen expansion and providing the graphic effect in the same direction as the expansion direction of the display 110, the screen vibration or shaking phenomenon due to the adjustment of the display reference point may be compensated.

Referring first to FIG. 9, it is assumed that a length of an X-axis area (an alpha area) rolled on the back of the electronic device 100 and not exposed in the slidable display 200 is Hidden, a length of an X-axis basic margin of the pre-expansion state is B, and an expansion degree (an expansion length) based on time is Expanded. In this case, the reference point (e.g., the zero point, the X-axis zero point, the horizontal axis reference point) before the expansion may be defined as 'Hidden+B'.

At the start of the screen expansion or during the screen expansion 910 and 912, and 914, the electronic device 100 may change the X-axis zero point 920, 922, and 924 in real time in the following manner.

First, at the start of the screen expansion or during the screen expansion 910 and 912, the X-axis zero point 920 and 922 may further move along the expansion direction (widthwise) from 0 by N pixels (or dpi) in sequence. The movement may be conducted faster than the screen expansion speed.

Second, a maximum extra margin may be set to 'B+Expanded+N pixel (or dpi)', and a start point reference X-axis zero point may be set to 'Hidden+B−Expanded+N (0−N)'.

Third, the reference point 924 may be moved and restored to the basic margin B to remove the extra margin right after the screen expansion complete (within a specific time from the expansion complete time). 'Hidden−Expanded=0+B' may be established in relation to the start point reference X-axis zero point.

The display reference point may be changed in real time by the scheme illustrated in FIG. 8A at the start of the expansion, or during the expansion.

Referring to FIG. 8A, in operation 810, the electronic device 100 may set the X-axis zero point which is the pre-expansion display reference point to 'Hidden+B'.

In operation 812, the electronic device 100 may detect occurrence of a display expansion event according to a user's input (e.g., a slide-out input, a roll-out input).

In operation 814, the screen expansion of the display 110 may commence or proceed. The X-axis zero point may be set to 'Hidden+B−Expanded+N'.

In operation 816, the electronic device 100 may set the N value to 'B*display expansion rate'. As the screen expands, the display expansion rate may increase and the N value may increase.

In operation 820, the electronic device 100 may determine whether the expansion of the display 110 is completed. For example, if the expansion distance of the display 110 reaches a maximum expansion distance predesignated, or if an input for expanding the display 110 is not received over a specific time, the electronic device 100 may determine that the expansion of the display 110 is completed.

If the expansion of the display 110 is not completed, the electronic device 100 may update the X-axis zero point by repeating operation 814 and operation 816 according to the screen expansion.

If expansion of the display 110 is completed, the electronic device 100 may sequentially decrease the N value to 0 fast in operation 822. Hence, the X-axis zero point may return to the basic margin B right after the screen expansion complete.

At the start of the reduction or during the reduction, the display reference point may change in real time in the manner shown in FIG. 8B. A similar manner to FIG. 8A may be applied in reverse to the screen reduction. In this case, the N value may be controlled not to exceed the maximum basic margin B.

Referring to FIG. 8B, in operation 850, the electronic device 100 may set the X-axis zero point which is the pre-expansion display reference point to 'Hidden+B'.

In operation 852, the electronic device 100 may detect occurrence of a display reduction event according to a user's input (e.g., a slide-in input, a roll-in input).

In operation 854, the screen reduction of the display 110 may commence or proceed. The X-axis zero point may be set to 'Hidden+B−Expanded−N'.

In operation 856, the electronic device 100 may set the N value to 'B*display reduction rate'. As the screen reduces, the display reduction rate may increase and the N value may decrease.

In operation 860, the electronic device 100 may determine whether the reduction of the display 110 is completed. For example, if the reduction distance of the display 110 reaches a maximum reduction distance predesignated, or if an input for reducing the display 110 is not received over a specific time, the electronic device 100 may determine that the reduction of the display 110 is completed.

If the reduction of the display 110 is not completed, the electronic device 100 may update the X-axis zero point by repeating operation 854 and operation 856 according to the screen expansion.

If the reduction of the display 110 is completed, the electronic device 100 may sequentially increase the N value to 0 fast in operation 862. Hence, the X-axis zero point may return to the basic margin B right after the screen reduction complete.

A screen control method according to various embodiments may be carried out by an electronic device (e.g., the electronic device 100 or the processor 120). For the sake of explanation, it is assumed that each operation is carried out by the processor 120 or the electronic device 100 of FIG. 1. The electronic device 100 or the processor 120 may be configured to execute at least part of operations of the screen control method according to an embodiment. At least one of the operations according to various embodiments may be omitted, sequence of some operations may be changed, or other operation may be added.

FIG. 10 is a block diagram illustrating an example electronic device 1001 in a network environment 1000 according to various embodiments.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In various embodiments, at least one of the components (e.g., the connecting terminal 1078) may be omitted from the electronic device 1001, or one or more other components may be added in the electronic device 1001. In various embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 1064 dB or less) for implementing mMTC, or U-plane latency (e.g., 0.5 ms or less for each of downlink (DL) and uplink (UL), or a round trip of 10 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element including a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments, an electronic device (e.g., the electronic device 100 of FIG. 1A) may include: a flexible display (e.g., the display 110 of FIG. 1A, the display 200 of FIG. 2A, the display 202 of FIG. 2C, and the display 204 of FIG. 2D) configured to change a size of an area exposed to outside of the electronic device and at least one processor (e.g., the processor 120 of FIG. 1A) connected to the flexible display.

The at least one processor may be configured to: based on the area being in a first size and a first screen (e.g., one of the first screen 327 of FIG. 3B, the first screen 360 of FIG. 3C, the first screen 520 of FIG. 5A, the first screen 526 of FIG. 5B, and the first screen 630 of FIG. 6B) being displayed in the area, receive an input for changing the area into a second size, and based on the area being changed to the second size according to the input, display a second screen (e.g., one of the second screen 329 of FIG. 3B, the second screen 364 of FIG. 3C, the second screen 524 of FIG. 5A, the second screen 529 of FIG. 5B, and the second screen 632, 634, and 636 of FIG. 6B) changing the first screen corresponding to the second size in the area changed into the second size.

The second screen may include, among a plurality of elements in content, a first element (e.g., one of the reference point 174 of FIG. 1B, the first object 337 of FIG. 3B, the reference word 370 or 375 of FIG. 3C, the first object 574 of FIG. 5A, and the first object 652, 644, and 646 of FIG. 6B) corresponding to an element (e.g., the reference point 170 of FIG. 1B, the reference object 332 of FIG. 3B, the reference word 370 of FIG. 3C, the first object 570 of FIG. 5A, and part of the first reference object 640 of FIG. 6B) in the first screen and a second element of the content.

According to various example embodiments, the second element may be different from the element in the first screen, and may be not displayed in the area while the area is in the first size.

According to various example embodiments, based on the element in the first screen being a text type, a text corresponding to the element may be rearranged and included in the second screen. Based on the element in the first screen being of an image or video, an image or at least part of a video corresponding to the element may be resized and included in the second screen.

According to various example embodiments, the element in the first screen may be displayed at a top of the area of the first size, the first element in the second screen may be displayed at a top of the area changed into the second size, and the second element in the second screen may be displayed at a bottom of the area changed into the second size.

According to various example embodiments, a display portion including the first element and the second element in the content may be determined based on any one of a type of the element in the first screen, a position of the element and user setting related to screen display.

According to various example embodiments, the element in the first screen may be displayed in response to a reference position of the area, and the first element in the second screen may be displayed in response to a reference position of the area changed into the second size.

According to various example embodiments, the at least one processor may be configured to control the flexible display to display the first element in response to a reference position of the area changed into the second size by moving the content.

According to various example embodiments, the at least one processor may be configured to move the content in a second direction perpendicular to a first direction in which the size of the area is expanded or reduced.

According to various example embodiments, an offset which is a movement degree of the content may be determined based on any one of a type of the element in the first screen, a position of the element and user setting related to screen display.

According to various example embodiments, based on the first element which rearranges or resizes the element in the first screen not being included in the second screen, an offset for including the first element in the second screen may be determined, and the content may be moved based on the offset.

According to various example embodiments, the at least one processor may be configured to, based on a display portion which is a part of a first content page being displayed in the area, obtain a second content page corresponding to the first content page, and move the content, based on comparison between an area of a top hidden portion of the first content page and an area of a top hidden portion of the second content page.

According to various example embodiments, the content may be moved, to keep the area of the top hidden portion of the first content page and the area of the top hidden portion of the second content page the same.

According to various example embodiments, the at least one processor may be configured to: include a first display portion which is a part of a first content page in the first screen and display in the area, identify the element in the first screen displayed in response to a reference position of the area, in the first display portion, obtain a second content page corresponding to the second size from the first content page, as the area is changed from the first size to the second size, identify the first element corresponding to the element in the first screen from the second content page, determine a second display portion in the second content page based on the first element and the second size, and include the second display portion in the second screen and display in the area changed into the second size.

According to various example embodiments, the at least one processor may be configured to further move the content in the first direction.

According to various example embodiments, the content may be moved based on at least one of a margin of the area, an expansion direction of the area, an expansion speed of the area, a reduction direction of the area and a reduction speed of the area.

According to various example embodiments, an electronic device (e.g., the electronic device 100 of FIG. 1A) may include: a flexible display (e.g., the display 110 of FIG. 1A, the display 200 of FIG. 2A, the display 202 of FIG. 2C, and the display 204 of FIG. 2D) configured to change a size of an area exposed to outside of the electronic device, and at least one processor (e.g., the processor 120 of FIG. 1A) connected to the flexible display.

The at least one processor may be configured to: based on the area being in a first size and a first screen (e.g., one of the first screen 327 of FIG. 3B, the first screen 360 of FIG. 3C, the first screen 520 of FIG. 5A, the first screen 526 of FIG. 5B, and the first screen 630 of FIG. 6B) including a part of an object being displayed in the area, receive an input for expanding a size of the area to a second size, and based on the area being expanded to the second size according to the input, display a second screen (e.g., one of the second screen 329 of FIG. 3B, the second screen 364 of FIG. 3C, the second screen 524 of FIG. 5A, the second screen 529 of FIG. 5B, and the second screen 632, 634, and 636 of FIG. 6B) expanding the first screen corresponding to the second size in the area expanded to the second size.

The second screen may include at least part of a first element corresponding to the object (e.g., one of the reference object 332 of FIG. 3B, the first object 570 of FIG. 5A, and the first reference object 640 of FIG. 6B) and a second object (e.g., the second object 672 or 676 of FIG. 6B).

According to various example embodiments, the second object may be different from the object, and may not be displayed in the area while the area is in the first size.

According to various example embodiments, a substantial entirety of the first object may be enlarged and displayed at a top of the area expanded to the second size according to the second size.

According to various example embodiments, the part of the first object may be enlarged and displayed at a top of the area expanded to the second size according to the second size, and the second object may be displayed at a bottom of the area expanded to the second size.

According to various example embodiments, at least part of the first object and the second object to be included in the second screen may be determined based on any one of a type of the object, a position of the object, and user setting related to screen display.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:
1. An electronic device comprising:
a flexible display including a display area visible from a front face of the electronic device, wherein a size of the display area is changeable, as at least part of the flexible display is moved, between a first size and a second size larger than the first size;

at least one processor comprising processing circuitry; and memory storing instructions, that when executed by the at least one processor individually and/or collectively, cause the electronic device to:

control the flexible display to display at least a first portion of an image object and a text area including characters in a first screen corresponding to the display area of the first size, based on a reference position in the first screen, based on a size of the display area visible from the front face being expanded and changed to the second size, determine a reference position of the display area of the second size by moving the reference position of the display area of the first size in a direction opposite to an expansion direction of the display area, and control the flexible display to display, in a second screen corresponding to the display area of the second size, the image object moved relative the moved reference position and scaled-up based on the second size while maintaining an aspect ratio, and the characters rearranged based on the moved reference position and the scaled-up image.

2. The electronic device of claim 1, wherein the at least part of the scaled-up image object being displayed in the second screen includes at least part of the first portion resized to a size corresponding to the second size.

3. The electronic device of claim 1,
wherein the image object includes a second portion different from the first portion,
wherein the second portion is not displayed when a size of the display area is the first size, and
wherein the at least part of the scaled-up image object being displayed in the second screen includes at least part of the second portion resized to a size corresponding to the second size.

4. The electronic device of claim 3, wherein the first portion is portion of the image object and the second portion is an upper portion of the image object.

5. The electronic device of claim 1, wherein while the first screen corresponding to the display area of the first size is displayed, the image object and the text area are arranged in a content page comprising at least one of a web page, an internet page or an application page,
wherein while the second screen corresponding to the display area of the second size is displayed, a position of at least one of the characters in the content page is sequentially rearranged and filled with them to correspond to the second size.

6. The electronic device of claim 1, wherein an offset indicating a movement degree of the reference position is determined based on at least one of a position of the image object or user setting related to screen display.

7. An electronic device comprising:
a flexible display including an area visible from a front face of the electronic device, wherein a size of the area is changeable, as at least part of the flexible display is moved, between a first size and a second size; and
at least one processor operatively connected to the flexible display, and configured to:
control the flexible display to display a first screen including a first portion of a first object and a second object including text in the area of the first size, wherein the first portion is displayed at a top of the first screen and the second object is positioned below the first object,
receive an input for changing a size of the area from the first size to the second size, and in response to the received input, control the flexible display to display a second screen including the text of the second object in the area changed to the second size, wherein the text is moved in a second direction perpendicular to a first direction in which the size of the area is expanded or reduced and is rearranged, based on at least one of a type of the first object, a position of the first object or user setting, determine whether to display the first object, that is resized and includes a second portion, in the second screen or not to display the resized first object, and if the determination is to display the resized first object including the second portion in the second screen, control the flexible display to display the resized first object at a top of the second screen, otherwise not to display the resized first object, wherein the second portion is not displayed when a size of the area is the first size.

8. The electronic device of claim 7, wherein the first portion is an lower portion of the first object and the second portion is an upper portion of the first object.

9. The electronic device of claim 7, wherein the at least one processor is configured to control the flexible display to display a substantial entirety of the first object is resized and displayed at the top of the second screen, if the determination is to display the resized first object including the second portion in the second screen.

10. A method operating an electronic device comprising a flexible display including a display area visible from a front face of the electronic device, wherein a size of the display area is changeable, as at least part of the flexible display is moved, between a first size and a second size, the method comprising:

displaying, through the flexible display, at least a first portion of an image object and text area including characters in a first screen corresponding to the display area of the first size, based on a reference position in the first screen;

displaying, in a second screen, corresponding to the display area of the second size, the image object moved relative the moved reference position and scaled-up based on the second size while maintaining an aspect ratio, and displaying, in the second screen, the characters rearranged based on the moved reference position and the scaled-up image.

11. The method of claim 10, wherein the at least part of the scaled-up image object being displayed in the second screen includes at least part of the first portion resized to a size corresponding to the second size.

12. The method of claim 10,
wherein the image object includes a second portion different from the first portion,
wherein the second portion is not displayed when a size of the display area is the first size, and
wherein the at least part of the resized image object being displayed in the second screen includes at least part of the second portion resized to a size corresponding to the second size.

13. The method of claim 12, wherein the first portion is a lower portion of the image object and the second portion is an upper portion of the image object.

14. The method of claim 10, wherein an offset indicating a movement degree of the reference position is determined based on at least one of a position of the image object or user setting related to screen display.

15. The method of claim 10, wherein while the first screen corresponding to the display area of the first size is displayed, the image object and the text area are arranged in a content page comprising at least one of a web page, an internet page or an application page, wherein while the second screen corresponding to the display area of the second size is displayed, a position of at least one of the characters in the content page is sequentially rearranged and filled with them to correspond to the second size.

\* \* \* \* \*